United States Patent
Goyal et al.

(10) Patent No.: US 9,667,879 B1
(45) Date of Patent: *May 30, 2017

(54) FOCUS-BASED SHUTTERING

(71) Applicant: Amazon Technologies, Inc., Seattle, WA (US)

(72) Inventors: Dushyant Goyal, Seattle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,324

(22) Filed: Dec. 2, 2016

Related U.S. Application Data

(63) Continuation of application No. 14/842,674, filed on Sep. 1, 2015, now Pat. No. 9,516,237.

(51) Int. Cl.
  *H04N 5/235* (2006.01)
  *H04N 5/232* (2006.01)
  *H04N 9/04* (2006.01)

(52) U.S. Cl.
  CPC ....... *H04N 5/2353* (2013.01); *H04N 5/23212* (2013.01); *H04N 9/045* (2013.01)

(58) Field of Classification Search
  CPC ... H04N 5/2353; H04N 5/23212; H04N 9/045
  See application file for complete search history.

(56) References Cited

U.S. PATENT DOCUMENTS

| | | | |
|---|---|---|---|
| 2010/0272356 A1* | 10/2010 | Hong | G06T 7/0002 382/170 |
| 2014/0355881 A1* | 12/2014 | Bhardwaj | G06T 7/0002 382/173 |
| 2015/0110403 A1* | 4/2015 | Cho | G06T 5/003 382/195 |
| 2015/0220806 A1* | 8/2015 | Heller | G06K 9/4676 382/159 |

* cited by examiner

*Primary Examiner* — Mekonnen Dagnew
(74) *Attorney, Agent, or Firm* — Athorus, PLLC

(57) ABSTRACT

Blur metrics may be calculated for each of the image pixels of a digital image of a scene captured using an imaging device. The blur metrics may be indicative of the level of blur expressed in the digital image, and a blur image representative of the blur metrics may be generated. Subsequently, when another digital image is to be captured using the imaging device, pixel sensors corresponding to high blur metrics may be digitized at a high level of priority, or at a high rate, compared to pixel sensors corresponding to low blur metrics, which may be digitized at a low level of priority, or at a low rate. The blur images may be updated based on changes in blur observed in subsequent images, and different pixel sensors may be digitized at higher or lower levels of priority, or at higher or lower rates, based on the changes in blur.

20 Claims, 22 Drawing Sheets

| | | | | | | | | | | | | | | | | |
|---|---|---|---|---|---|---|---|---|---|---|---|---|---|---|---|---|
|0.2|0.2|0.2|0.2|0.2|0.2|0.2|0.2|0.2|0.2|0.2|0.2|0.2|0.2|0.2|0.2|0.2|
|0.1|0.1|0.1|0.1|0.2|0.8|0.2|0.2|0.2|0.2|0.2|0.2|0.2|0.2|0.2|0.2|0.2|
|0.1|0.1|0.1|0.1|0.7|0.8|0.1|0.1|0.1|0.1|0.1|0.1|0.1|0.2|0.2|0.2|0.2|
|0.1|0.1|0.1|0.7|0.8|0.8|0.8|0.8|0.8|0.7|0.7|0.1|0.1|0.1|0.1|0.1|0.1|
|0.1|0.1|0.6|0.7|0.8|0.8|0.8|0.1|0.1|0.8|0.1|0.1|0.1|0.1|0.1|0.1|0.1|
|01|0.1|0.7|0.9|0.8|0.8|0.8|0.8|0.8|0.8|0.8|0.1|0.1|0.1|0.1|0.1|0.1|
|0.1|0.6|0.9|0.9|0.9|0.8|0.8|0.8|0.6|0.8|0.8|0.8|0.1|0.1|0.1|0.1|0.1|
|0.1|0.6|0.9|0.9|0.9|0.8|0.1|0.3|0.4|0.8|0.9|0.9|0.8|0.1|0.1|0.1|0.1|
|0.1|0.1|0.2|0.9|0.2|0.1|0.1|0.3|0.4|0.8|0.9|0.9|0.8|0.1|0.1|0.1|0.1|

FOCUS-BASED SHUTTERING

CROSS-REFERENCE TO RELATED APPLICATIONS

This application is a continuation of U.S. patent application Ser. No. 14/842,674, filed Sep. 1, 2015, now U.S. Pat. No. 9,516,237, the contents of which are incorporated by reference herein in their entirety.

BACKGROUND

Imaging data (e.g., digital images, depth images or other sets of data) typically includes a collection of image pixels, arranged in an array corresponding to a frame, which defines an optically formed reproduction of one or more objects, backgrounds or other features of a scene. For example, in a digital image, each of the pixels represents or identifies a color or other light condition associated with a portion of such objects, backgrounds or features. A black-and-white digital image includes a single bit for representing a light condition of a pixel in a binary fashion (e.g., either black or white), while a grayscale digital image may represent the light condition in multiple bits (e.g., two to eight bits for defining tones of gray in terms of percentages or shares of black-and-white), and a color digital image may include groups of bits corresponding to each of a plurality of base colors (e.g., red, green or blue), with the groups of bits collectively representing a color associated with the pixel. In a depth image, each of the image pixels represents or identifies not a light condition or color of such objects, backgrounds or features, but a distance to objects, backgrounds or features. For example, a pixel of a depth image may represent a distance between an imaging sensor of an imaging device (e.g., a depth camera or range sensor) that captured the depth image and the respective object, background or feature to which the pixel corresponds. Other imaging data (e.g., infrared images, or radiographic images) may include image pixels having values corresponding to variables other than color or distance, such as heat or radiation.

Presently, there are two primary techniques for operating (or "shuttering") an imaging device such as a digital camera, a range camera, an infrared camera, a radiographic camera or the like to capture imaging data. Global shuttering (or, simply, "global shutter") is a method in which each of the pixel sensors provided on an imaging sensor, e.g., a photosensitive surface, is exposed and processed simultaneously. The pixel sensors are exposed for a finite and common period of time, called an "exposure time," defined by a shutter speed for the imaging sensor. When this period of time has elapsed, e.g., after each of the pixel sensors has been exposed, analog signals generated by the exposure of the entire array of pixel sensors in an imaging area (known as a "frame") are converted to digital signals, in series. Some imaging sensors that operate according to global shutter methods typically include charge-coupled devices (or CCD) or like components.

Rolling shuttering (or, simply, "rolling shutter") is a method in which a plurality of pixel sensors provided on an imaging sensor, e.g., a photosensitive surface, is exposed and processed in a rolling fashion, such as row-by-row or column-by-column, across multiple rows or columns of pixels in an imaging area, and not simultaneously. Thus, a rolling shutter method exposes pixel sensors on different portions of the imaging area at different points in time, and for common periods of time (e.g., exposure times), before converting analog signals generated by pixel sensors in a common row or column into digital signals. The points in time at which the pixel sensors of a common row or column are exposed may differ by fractions of seconds. Some image sensors that operate according to rolling shutter methods typically include complementary metal oxide semiconductor (or CMOS) chips or like components.

Global shutter methods are advantageous because each of the pixel sensors is exposed, and analog signals captured by such sensors is processed, at a common time. However, due to the fact that each of the analog signals of a frame must be converted to digital signals before any of the pixel sensors may be exposed again, global shutter methods are often subject to congestion or bottlenecking, and must therefore operate with comparatively lower frame rates. Conversely, rolling shutter methods are advantageous because such methods may operate with higher frame rates, and because each row or column of pixel sensors within a frame may, once the analog signals captured by the pixel sensors within the row or column are converted to digital signals, be subjected to exposure again and subsequently processed. However, the processing of pixel sensors on a row-by-row or column-by-column basis naturally introduces a time delay between the processing of respective or adjacent rows or columns, which may result in blurring or other spatial distortions in the imaging data captured using such pixel sensors.

DETAILED DESCRIPTION

Figure 1A:
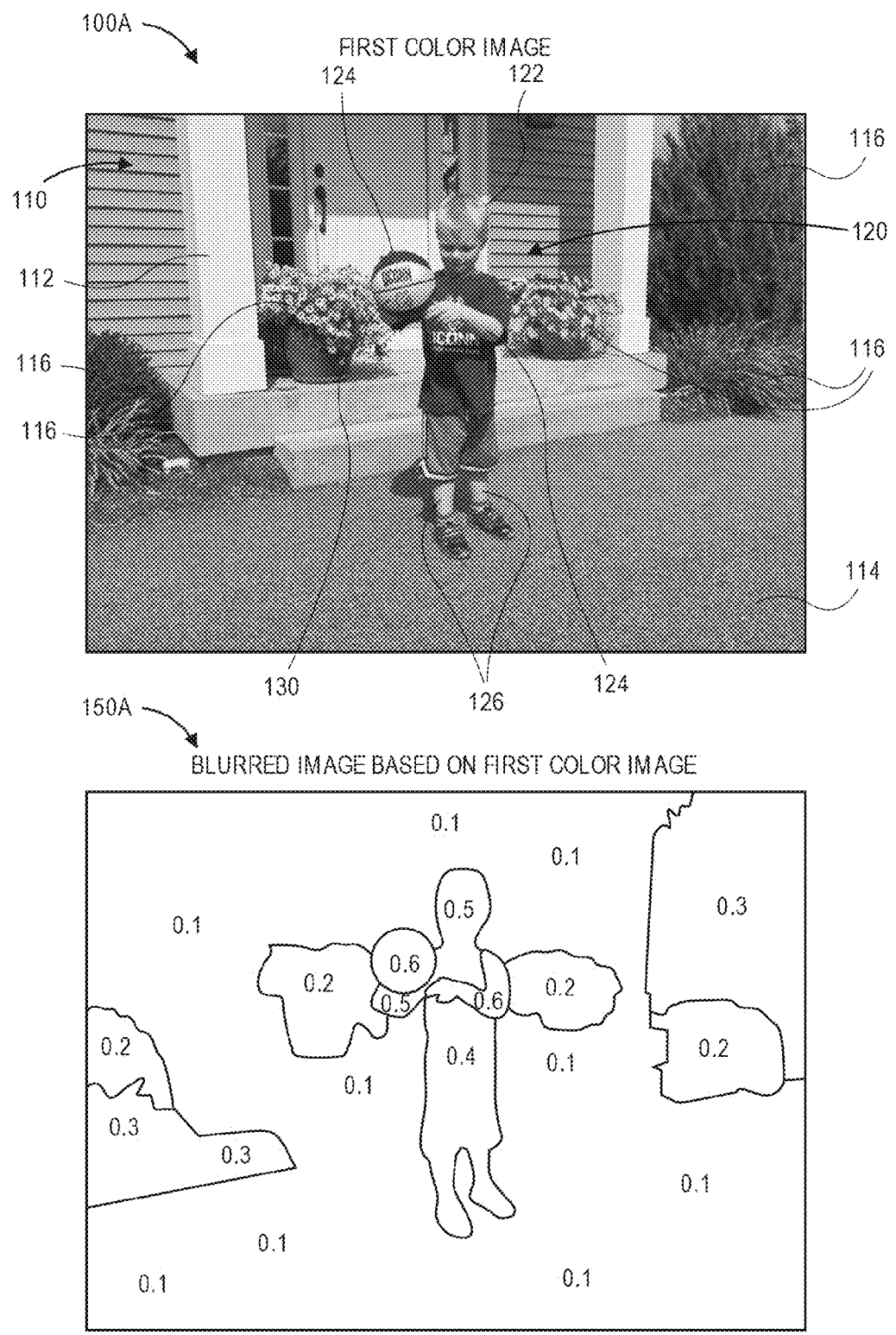
FIGS. 1A through 1F are views of imaging data associated with a system for focus-based shuttering in accordance with embodiments of the present disclosure.

As is set forth in greater detail below, the present disclosure is directed to focus-based shuttering. More specifically, the systems and methods of the present disclosure are directed to systems and methods for shuttering pixel sensors based on contents of imaging data captured by such pixel sensors, which may enable imaging data to be captured at increased frame rates and with high image quality. In accordance with some embodiments of the present disclosure, a set of low-resolution imaging data including blur metrics (e.g., blur values) for each of a plurality of image pixels of a color, grayscale or black-and-white image may be defined. Once determined, the blur metrics may be utilized to control rates at which individual pixel sensors within a frame are shuttered, and at which analog signals captured by such pixel sensors are processed and converted into digital signals, or combined to form a blur image which represents the values of such blur metrics.

For example, where an individual image pixel or region of image pixels of a color image is identified as having a high blur metric, that individual image pixel or region may be sampled at a higher rate than an individual image pixel or region of image pixels of the color image that is identified as having a low blur metric. In some embodiments, a low-resolution image may be captured and evaluated using auto-focusing or other techniques, and blur metrics may be calculated based on image pixels of the low-resolution image. Such blur metrics may be processed in order to define weighted regions-of-interest for the conversion of analog signals captured using pixel sensors corresponding to such regions to digital signals, such that pixel sensors corresponding to high-blur image pixels within such regions may be converted at a higher level of priority or at a higher rate, while analog signals captured using pixel sensors corresponding to low-blur image pixels within such regions may be converted at a lower level of priority or at a lower rate. Moreover, a blur image may be defined based on the blur metrics determined for each of the image pixels of a color image, and updated accordingly based on changes to the content of such image pixels, or the values of the blur metrics, as such content or values change from image to image, e.g., in a subsequent image, or in one or more subsequent frames.

Accordingly, the systems and methods of the present disclosure may improve the quality of imaging data captured using any type or form of imaging devices, as compared to imaging devices which operate according to global shutter methods (e.g., CCD-based imaging devices), or imaging devices which operate according to rolling shutter methods (e.g., CMOS-based imaging devices). Because the systems and methods of the present disclosure may control the shuttering of individual pixel sensors based on the content of imaging data previously captured by such pixel sensors, the deficiencies of global shutter methods and rolling shutter methods may be overcome. For example, pixel sensors which previously captured imaging data having high levels of blur may be shuttered, and analog signals captured by such pixel sensors may be digitized, at relatively high rates, thereby enhancing the clarity and reducing the blur from imaging data (e.g., images or frames) subsequently captured by such pixel sensors. Conversely, pixel sensors which previously captured imaging data having low levels of blur may be shuttered, and analog signals captured by such pixel sensors may be digitized, at relatively low rates, thereby ensuring that such pixel sensors are exposed for sufficient durations in order to capture colors having an appropriately rich level of color or intensity.

Referring to FIGS. 1A through 1F, views of imaging data associated with a system for focus-based shuttering in accordance with embodiments of the present disclosure are shown. The imaging data shown in FIGS. 1A through 1F includes color images 100A, 100B, 100C, 100D, 100E, 100F of a scene 110 including an actor 120 (viz., a child) and an object 130 (viz., a bounceable ball).

Referring to FIG. 1A, the first color image 100A shows the actor 120 and the object 130 within the scene 110, which includes various background features, including a building 112 (e.g., a dwelling), a surface element 114 (e.g., a driveway) and various flora 116 (e.g., trees, shrubs, flowers). The actor 120 includes a head 122, a pair of arms 124 and a pair of legs 126. Additionally, as is also shown in FIG. 1A, the actor 120 is able to manipulate (e.g., hold or dribble) the object 130 with his hands.

In accordance with the present disclosure, a blur image 150A may be generated based on aspects of the first color image 100A, such as the various image pixels of the first color image 100A, or one or more homogenous or heterogeneous regions or sectors of such pixels. For example, for each of the pixel sensors of a photosensitive surface or sensing region of an imaging device, analog signals corresponding to the incident light striking the photosensitive surface or sensing region may be converted to digital signals. Based on the intensities and/or color components of digital signals corresponding to an image pixel (e.g., the extent of red, green and blue in a color pixel, or the percentage or share of black and/or white in a grayscale pixel), or of digital signals corresponding to one or more surrounding image pixels, a blur metric, e.g., a measure of the blurriness (or an inverse measure of the sharpness) of the image pixel may be determined in absolute or relative (e.g., within a range from zero to one) terms. The blur metrics determined for each of the image pixels may then be formed into the blur image 150A, which may be stored in association with the first color image 100A in one or more data stores. Based on the blur metrics of such image pixels, one or more discrete regions of common or substantially similar blur metrics may be defined.

As is shown FIG. 1A, the blur image 150A represents the relative blurriness of the regions of image pixels of the first color image 100A in relative terms. For example, the blur image 150A indicates that the background features of the scene 110 are experiencing relatively low levels of blur. The portions of the first color image 100A corresponding to much of the building 112 or the surface element 114, which are rigid and substantially fixed in position, have blur metrics of 0.1, while portions of the first color image 100A corresponding to the flora 116, which are also fixed in position but may be subject to wind flows or other motive forces, have blur metrics of 0.2 or 0.3. The blur image 150A also indicates that some portions of the first color image 100A corresponding to the actor 120 are experiencing moderate levels of blur, e.g., the legs 126, which are shown with blur metrics of 0.4, and the head 122 and one of the arms 124, which are shown as having a blur metric of 0.5. Additionally, the blur image 150A further indicates that another of the arms 126 and the object 130 are shown as having blur metrics of 0.6.

Figure 1B:
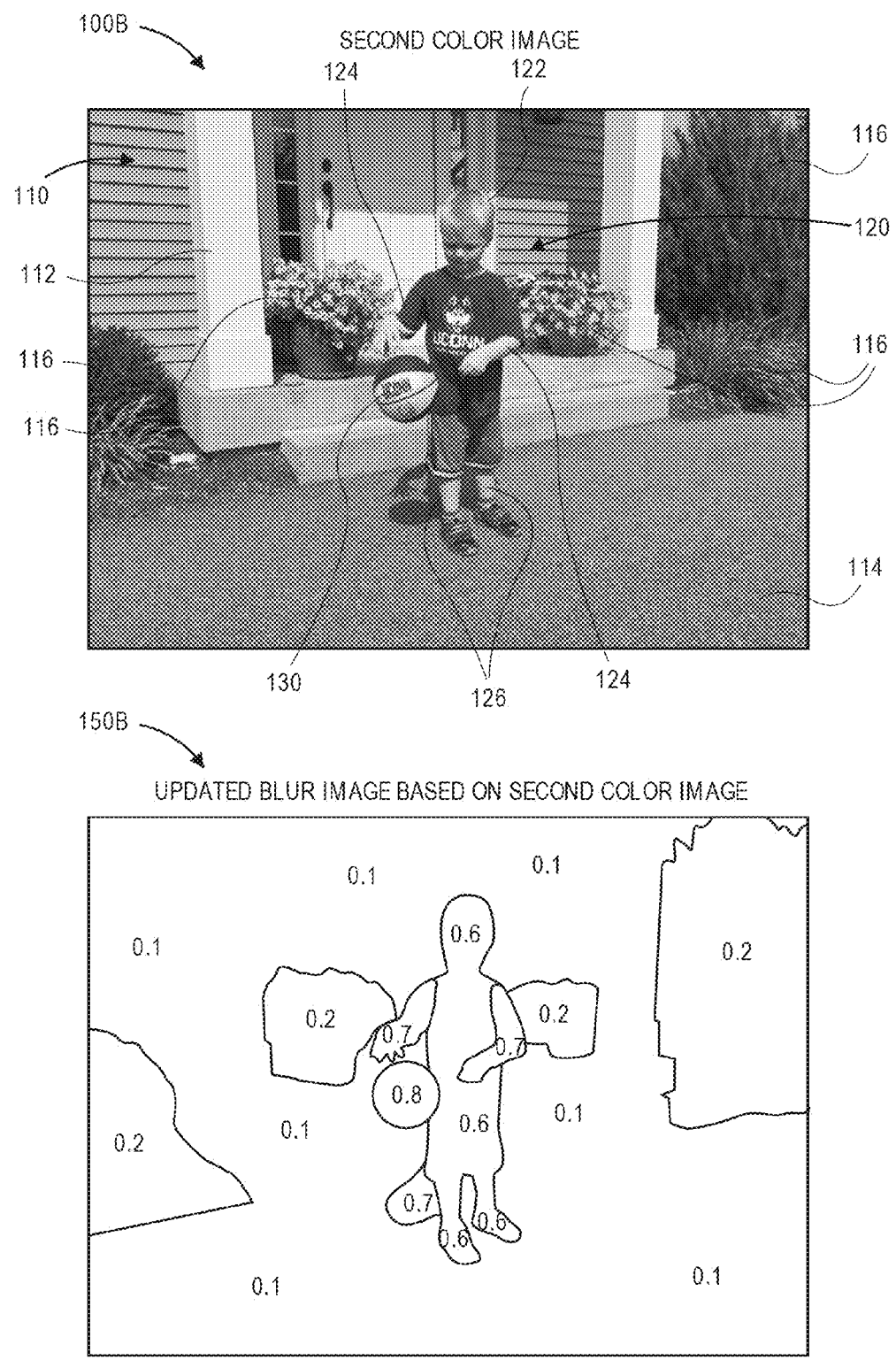

As is shown in FIG. 1B, the second color image 100B of the scene 110 shows the actor 120 after having manipulated the object 130, viz., after releasing the ball to bounce onto the driveway. Based on the manipulation of the object, as expressed in the second color image 100B, the blur image 150A of FIG. 1A may be updated to represent the relative blurriness of the regions of pixels of the second color image 100B in relative terms. For example, like the blur image 150A, the updated blur image 150B indicates that the portions of the second color image 100B corresponding to the background features of the scene 110, e.g., the building 112, the surface element 114 or the flora 116, continue to experience relatively low levels of blur, including blur metrics of 0.1 or 0.2. However, portions of the second color image 100B corresponding to the actor 120 or the ball 130 are experiencing increased levels of blur, based on the manipulation of the object 130, as compared to like portions of the first color image 100A. For example, as is shown in FIG. 1B, the updated blur image 150B indicates that portions of the second color image 100B corresponding to the head 122 and the legs 126 of the actor 120 have blur metrics of 0.6, while portions of the color image corresponding to the arms 124 of the actor have blur metrics of 0.7, and the portion of the color image corresponding to the object 130 has a blur metric of 0.8.

Figure 1C:
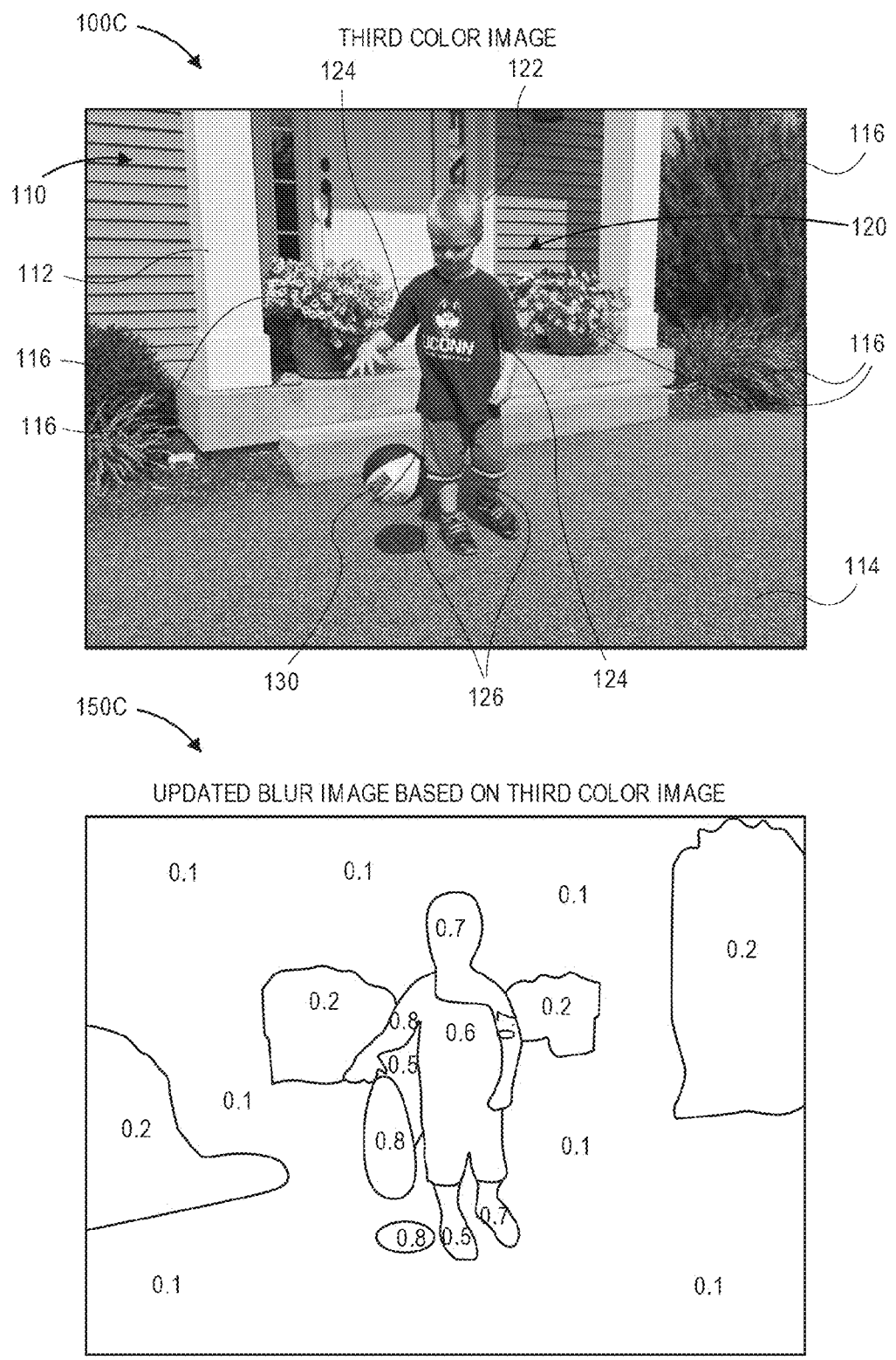
Figure 1D:
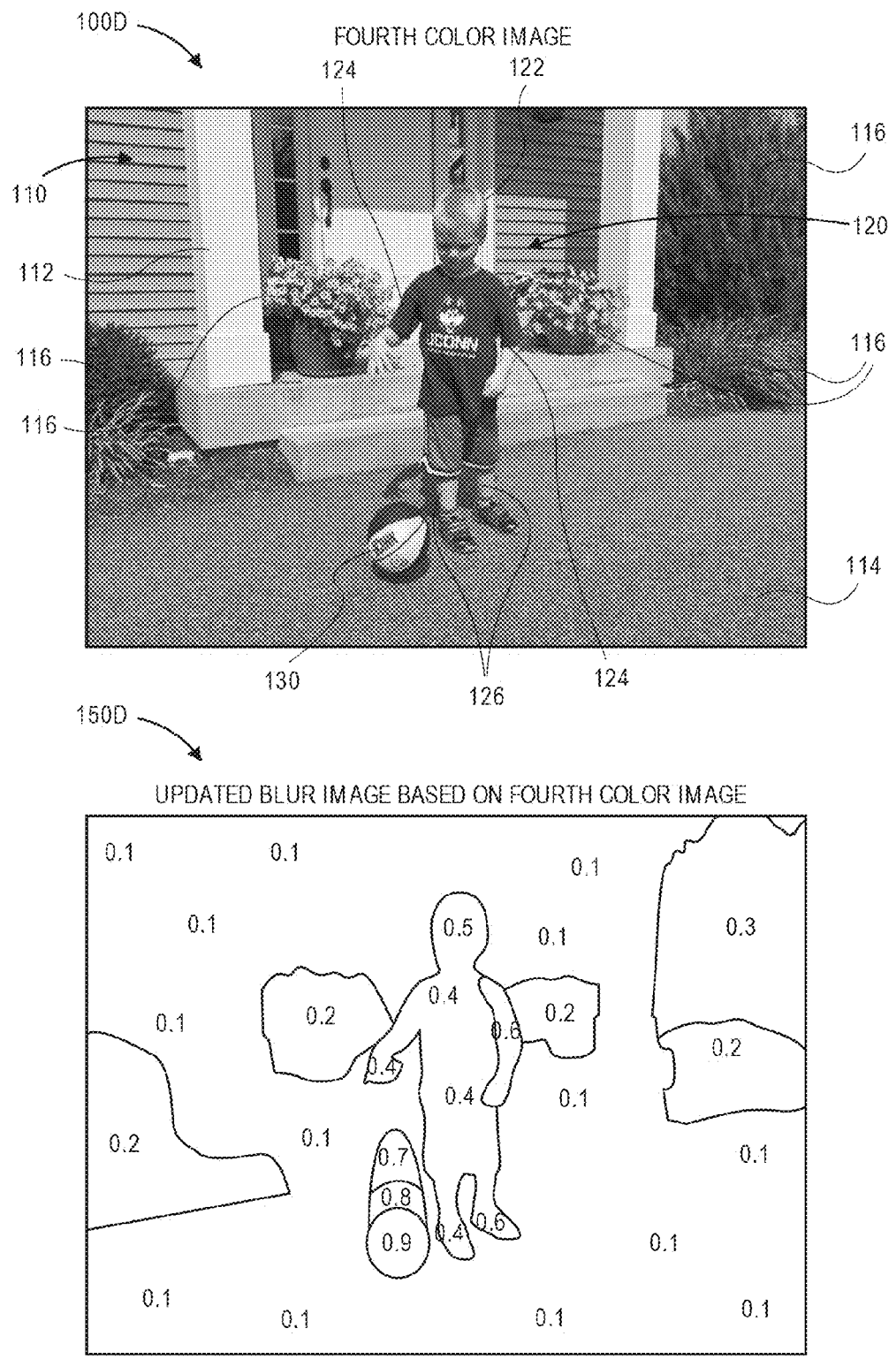

Similarly, as is shown in FIG. 1C, the third color image 100C of the scene 110 shows the actor 120 after having manipulated the object 130. Therefore, the updated blur image 150C indicates that the portions of the third color image 100C corresponding to the background features of the scene 110 have blur metrics of 0.1 or 0.2, while the portions of the third color image 100C corresponding to the actor 120 have blur metrics ranging from 0.5 to 0.8, and the portions of the third color image 100C corresponding to movement of the object 130 have a blur metric of 0.8. As is shown in FIG. 1D, the fourth color image 100D of the scene 110 shows the actor 120 as the object 130 comes into contact with the surface element 114. Therefore, the updated blur image 150D indicates that the portions of the fourth color image 100D corresponding to the movement of the object 130 have blur metrics of 0.7 to 0.9, that the portions of the fourth color image 100D corresponding to the background features of the scene 110 have blur metrics of 0.1 to 0.3, and that the portions of the fourth color image 100D corresponding to the actor 120 have blur metrics ranging from 0.4 to 0.6.

Figure 1E:
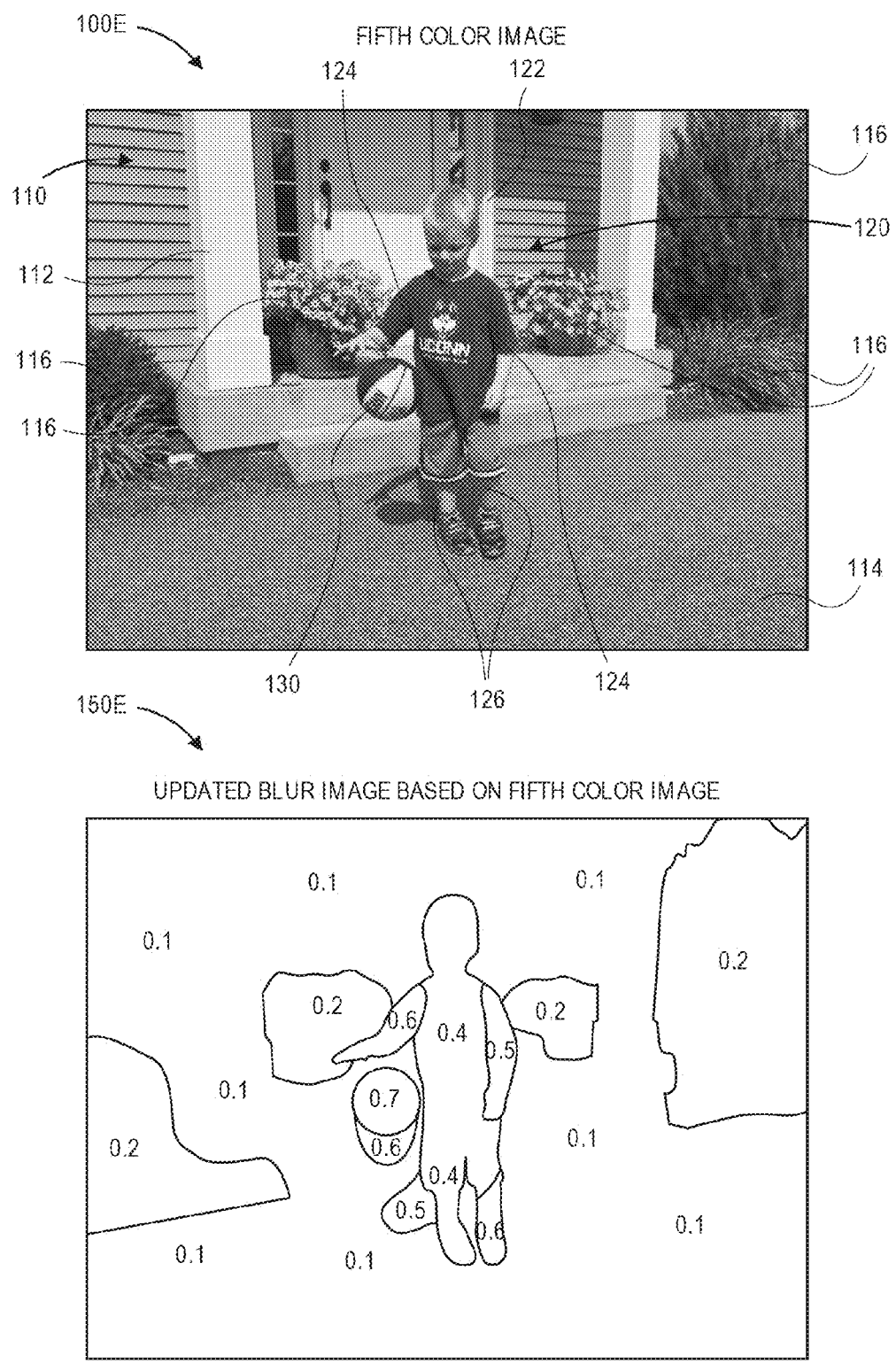
Figure 1F:
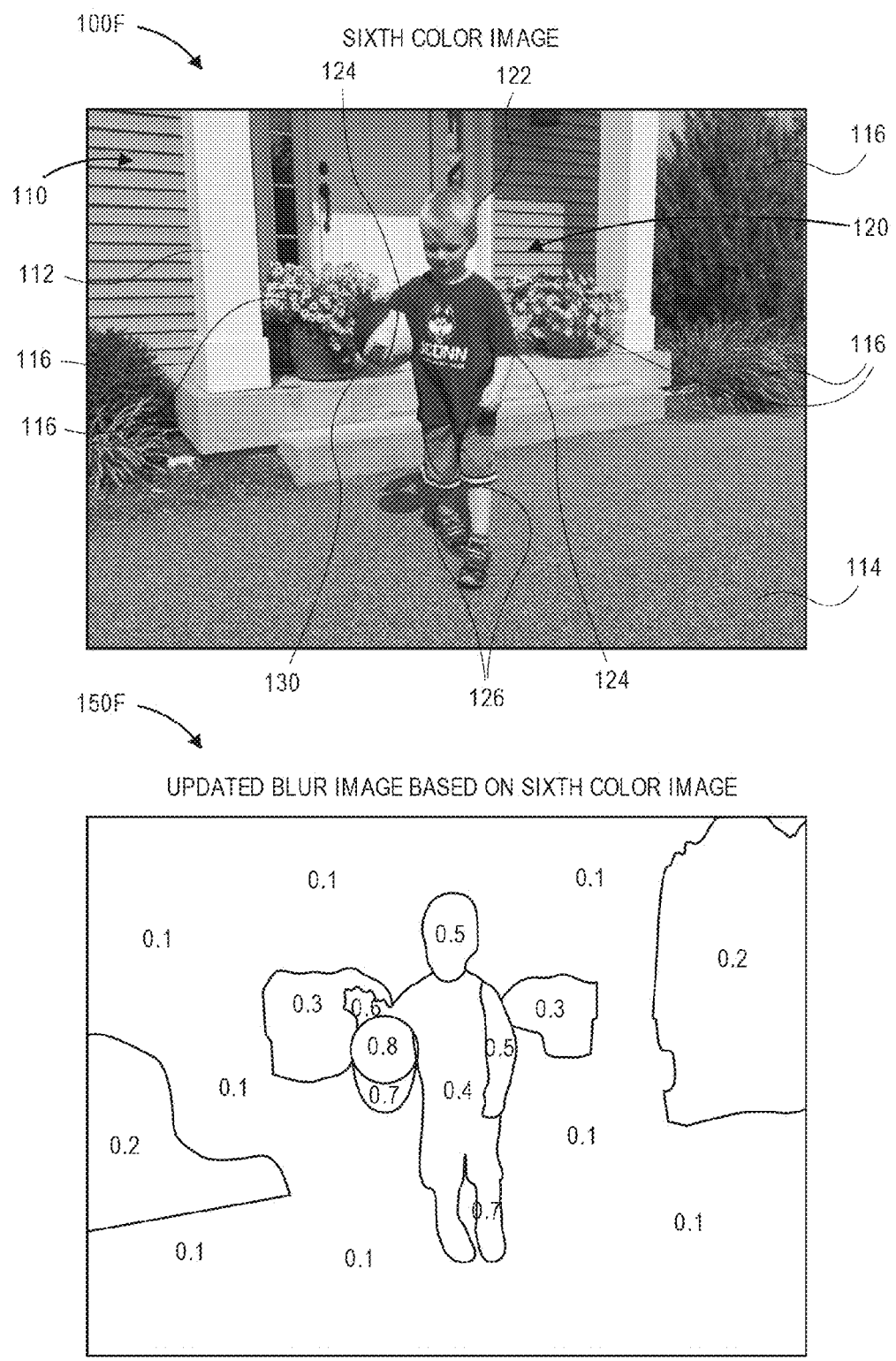

As is shown in FIG. 1E, the fifth color image 100E of the scene 110 shows the object 130 returning to the actor 120 following contact with the surface element 114. The updated blur image 150E indicates that portions of the fifth color image 100E corresponding to the movement of the object 130 have blur metrics of 0.6 and 0.7, while the portions of the fifth color image 100E corresponding to the arms 124 and one of the legs 126 have blur metrics of 0.5 to 0.6 and the portions of the fifth color image 100E corresponding to the remainder of the actor 120 have a blur metric of 0.4. The portions of the fifth color image 100E corresponding to the background features of the scene 110, including the building 112, the surface element 114 or the flora 116 have blur metrics of 0.1 or 0.2. As is shown in FIG. 1F, the sixth color image 100F of the scene 110 shows the object 130 contacting the actor 120. The updated blur image 150F indicates that portions of the sixth color image 100F corresponding to the movement of the object 130 have blur metrics of 0.7 and 0.8, while portions of the sixth color image 100F corresponding to the background features of the scene 110 have blur metrics of 0.1 to 0.3, and portions of the sixth color image 100F corresponding to the actor 120 have blur metrics ranging from 0.4 to 0.7.

Accordingly, the systems and methods of the present disclosure may be used to evaluate the content or characteristics of light captured by an imaging sensor, and determine the extent to which pixels corresponding to such light are blurry or sharp, such as by calculating a blur metric based on the values of each of the pixels of a color image (e.g., an RGB image) or a grayscale image. A blur image indicative of the blur metrics of the imaging data may thus be derived and stored in one or more data stores. Regions of image pixels having common or similar blur metrics may be derived, and information regarding the blur metrics determined for such pixels or regions of pixels may be utilized for any purpose. For example, when a region of image pixels of a color image is identified as blurry, e.g., based on a relatively high level of a blur metric determined for such pixels, pixel sensors corresponding to the region may be sampled at a higher rate in order to reduce the motion blur observed in subsequent color images, and to address the changing nature of the image pixels of the region. Conversely, when a region of pixels is identified as sharp, e.g., based on a relatively low level of a blur metric determined for such pixels, pixel sensors corresponding to the region may be sampled at lower rates, as the content of the region of pixels does not frequently change. The definition of such regions (e.g., the identification of image pixels having substantially common blur metrics) or the calculation of blur metrics for such regions may be updated based on the content of subsequently captured imaging data, e.g., the image pixels of a subsequently captured color image.

In this regard, the identification of blur metrics and the generation of a blur image based on such metrics enables pixels to be processed based on their respective content, and whether such content has changed from frame-to-frame. Pixels of images or frames that have not changed (e.g., image pixels that have comparatively low blur metrics) need not be sampled and digitized in every frame, while pixels of images or frames that change frequently (e.g., image pixels that have comparatively high blur metrics) may be sampled and digitized more frequently. Therefore, the systems and methods of the present disclosure may provide content-based shuttering techniques that are alternatives to either global shuttering or rolling shuttering methods and which operate by shuttering pixel sensors based on the level of blur observed in imaging data previously captured by such pixel sensors. Using one or more of such techniques, imaging data may be captured at higher frame rates or with less noise than either global shuttering or rolling shuttering, while reducing or eliminating spatial aberrations from fast-moving objects or gradients associated with triggered illumination and avoiding the overlapping of channels within the imaging data.

Imaging data in the form of visual imaging data, depth imaging data, infrared imaging data, radiographic imaging data, or any other type or form of imaging data, may be captured using one or more imaging devices such as digital cameras, depth sensors, range cameras or infrared cameras. Such devices may generally operate by capturing light that is reflected from objects, and by subsequently calculating or assigning one or more quantitative values to aspects of the reflected light, e.g., image pixels, generating an output based on such values, and storing such values in one or more data stores. For example, a digital camera may include one or more sensors having one or more filters associated therewith, and such sensors may detect information regarding aspects of any number of image pixels of the reflected light corresponding to one or more base colors (e.g., red, green or blue) of the reflected light, or distances to objects from which the light was reflected. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

Imaging data files that are stored in one or more data stores may be printed onto paper, presented on one or more computer displays, or subjected to one or more analyses, such as to identify items expressed therein. Such data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick- Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #D61123. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Typically, imaging devices operate in one of two shutter readout modes, e.g., modes by which charges resulting from light captured by a sensor are converted to digital signals. Such readout modes are called global shutter and rolling shutter. In sensors having global shutter architectures, an entire frame of an imaging sensor is exposed at the same time, and such that each of the pixel sensors on the imaging sensor begin gathering light. After a period of time defined by a shutter speed, the gathering of light by the imaging sensor is halted, and signals corresponding to the light captured by each of the pixel sensors within the frame are converted into digital data in series. More specifically, in a global shutter method, the pixel sensors of the imaging sensor begin and end their respective exposures simultaneously, before simultaneously transferring their respective charges to a non-photosensitive transistor for digitization. In a readout process, an analog-to-digital converter clocks through the imaging sensor, converting each of the analog signals captured by pixel sensors (e.g., wells or other portions of a photosensitive surface) to digital signals in series. Once the charges associated with the captured light are converted to digital signals, the pixel sensors of the imaging sensor are cleared to eliminate any accumulated charges, thereby providing a clean slate for a subsequent exposure and digitization.

Global shutter methods thus eliminate time delays associated with the exposure of the pixel sensors on the imaging sensor, for both illumination and digitization. Because each of the pixel sensors within an image frame is exposed simultaneously and for an identical period of time, blurring occurring within the frame is minimized or eliminated. However, because the light gathered by each of the pixel sensors is converted into digital signals in series, despite the fact that each of the pixel sensors is exposed simultaneously and for an identical period of time, image sensors operating in global shutter modes or according to global shutter methods typically have substantially reduced frame rates compared to other image sensors or imaging methods. In order to counter this deficiency, global shutter sensors or methods may operate with reduced exposure times, thereby resulting in degraded image quality or increased pixel noise, or utilize increased intensities of incident light, which may require additional illuminating equipment that occupies space within confined environments and costs additional sums of money.

Conversely, in sensors that operate according to rolling shutter methods, each individual row (or column) of pixel sensors on an imaging sensor is exposed, and the light captured by each of the pixel sensors is digitized, at different times, virtually "rolling" across the imaging sensor. For example, in one rolling shutter method, a first row of pixel sensors on an imaging sensor is exposed to light, and charges (e.g., analog signals) generated by the exposure to the light are converted to digital signals, e.g., by an analog-to-digital converter. After the pixel sensors of the first row are exposed and converted, a second row of pixel sensors on the imaging sensor is exposed to light, and charges generated by the exposure to the light are converted to digital signals, and so on and so forth. Once charges generated by the exposure to light of each of the pixel sensors in each of the rows on the imaging sensor are converted to digital signals, the first row of pixel sensors on the imaging sensor may be exposed to light again, and charges generated by the subsequent exposure are converted to digital signals, thus repeating the process for as long as the capture of imaging data is desired.

The exposure and digitization of rows of pixel sensors at different times may introduce shutter spatial distortions and complexity to the capture of imaging data, particularly where a subject from which the imaging data is to be captured is moving. The motion of a subject within a field of view of an imaging sensor operating according to rolling shutter methods may cause skewing, wobbling, or partial (e.g., less than full) exposure, which are driven by the frame rate, not shutter speed, as with global shutter methods. For example, a faster frame rate results in less skew, wobbling or partial exposure, while a slower frame rate may result in greater skew, wobbling or partial exposure, particularly where the subject is moving at a high rate of speed or is large. In such instances, the shape and structure of the subject may appear to vary within the frame. Furthermore, timing the illumination of a subject with a light source may become challenging, as different rows of pixel sensors may be illuminated to different extents at different times, and delays between the digitization of a prior row and an exposure of a subsequent row may lead to a reduction in the overall amount of light exposure for each of the rows.

The systems and methods of the present disclosure are directed to novel techniques or procedures for shuttering an imaging device to capture light on a plurality of pixel sensors of a photosensitive surface or other sensor, for reading the pixel sensors and for converting the light captured by such pixel sensors to digital signals. Such systems and methods determine a measure or extent to which the image pixels are blurry or sharp, based on color or grayscale values of such image pixels, and encode a metric (or value) corresponding to a level of blurriness or sharpness based upon a level of focus for each of the image pixels. The blur metrics may thus be aggregated into a blur image corresponding to an original color or grayscale image that represents the level of blurriness or sharpness for each of the image pixels. Subsequently, the blur metrics, or the blur image, may be utilized to select the image pixels of the color or grayscale image for digitization, thereby eliminating the congestion and delays associated with the analog-to-digital conversation process. For example, image pixels having high blur metrics (or blur values) may be sampled at higher rates, to reduce blurring that may be encountered due to motion of a subject, while image pixels having low blur metrics (or blur values) may be sampled or read off a sensor at lower rates. In accordance with the present disclosure, such systems and methods enable higher frame rates in global shuttering modes (e.g., in CMOS-based cameras or other imaging devices), or may reduce motion blurring or noises captured during rolling shuttering modes (e.g., in CCD-based cameras), while reducing or eliminating spatial aberrations or gradients, and enabling fast-excitation channel switching.

Any number of algorithms, techniques, machine learning systems or classifiers may be used to determine values of blur metrics for image pixels of a digital image (e.g., a color image or a grayscale image) in accordance with the present disclosure. For example, a variance of absolute values of a Laplacian operator, e.g., a two-dimensional isotropic measure of a second spatial derivative of an image, may be used to calculate a descriptor of a level of blur (or sharpness) of an image based on second-order derivatives, or to identify high spatial frequencies, such as those that may be associated with sharp edges or features of an image. Likewise, an image may be convolved using a Laplacian operator, and a descriptor of a level of blur (or sharpness) of the image may be calculated based on a sum of the resultant absolute values over a window of defined pixel dimensions. A descriptor of a level of blur (or sharpness) of the image may be determined using a Tenengrad operator, e.g., based on a local sum of a square of gradients, or using a Sobel operator to determine strengths of horizontal and vertical gradients. Further, a modified Tenengrad operator may determine a descriptor of a level of blur (or sharpness) of the image using a variance of the sum of squares of Sobel gradients, thereby defining a more discriminative measure while increasing a level of responsiveness to noise. In some other embodiments, other blur detection algorithms, techniques, machine learning systems or classifiers may be utilized to determine the extent to which an image pixel within a color or grayscale image is blurry or sharp, e.g., based on the image pixel and one or more surrounding image pixels, including but not limited to identifying one or more edges or other features within the image and measuring the extent to which the edges are blurry or sharp.

The determination of blur metrics, and the generation of a blur image based on the values of such blur metrics, including but not limited to the identification of regions or areas within a digital image having common or substantially similar blur metrics, may be performed by any type or form of computing device, including but not limited to one or more processors, integrated circuits (e.g., field-programmable gate arrays or systems-on-chips) or other components provided on an imaging device, or one or more other processors or other components associated with an external imaging data processing system. Moreover, regions of image pixels identified as having common or substantially similar blur metrics may have any shape, and may consist of a single pixel within a blur image, or all of the image pixels within the blur image (e.g., a blur image may consist of two or more of such regions).

The blur metrics, and the blur images, of the present disclosure may be generated in any sequence and in any manner. For example, a low-resolution color or grayscale image may be captured using an imaging device and processed to identify blur metrics of the image pixels of the image. The blur metrics may be identified for each of the pixels using any type or form of algorithms, techniques, machine learning systems or classifiers, e.g., outputs of one or more Laplacian operators or Tenengrad operators. Once the blur metrics have been identified, both color values (e.g., values of red, green and blue components of an image pixel, or grayscale values of the image pixel) and blur metric values are available for each of the image pixels. A blur image may be defined based on such blur metric values, and one or more regions of common or substantially similar blur metric values may be defined and utilized for any purpose.

For example, after a blur image has been generated, when light is subsequently captured and intended for processing into a high-resolution color image, e.g., in a subsequent frame, the regions of the blur image may be used to determine an order in which subsequently captured light within pixels corresponding to such regions is digitized into a high-resolution color image. Pixel sensors corresponding to regions of image pixels of a color image having high blur metrics may be sampled before or prior to pixel sensors corresponding to regions of image pixels having low blur metrics. Region-by-region, analog signals captured by pixel sensors may be digitized in an order defined by content previously captured by such pixel sensors, e.g., according to the respective blur metrics of regions of the blur image, or at frequencies or rates determined based on such content. Similarly, after a blur image has been generated, an imaging device may be automatically directed to sharpen a level of focus on regions of an imaging sensor corresponding to high blur metrics, and away from regions of the imaging sensor corresponding to low blur metrics, in orders based on such blur metrics, or at frequencies or rates determined based on such blur metrics.

Furthermore, the blur metrics and blur images of the present disclosure may be updated over time. For example, where blur metrics are determined for pixels of a first frame of color or greyscale imaging data digitized from a first exposure of a photosensitive surface of an imaging sensor, and a blur image is generated based on such blur metrics, the photosensitive surface of the imaging sensor may be subjected to a second exposure, and blur metrics may be determined based on a second frame of the imaging data. Once the blur metrics have been determined, the blur image may be updated accordingly, as necessary. If the blur metrics determined following the second exposure are unchanged or substantially similar to the blur metrics determined following the first exposure, portions of the blur image including the unchanged or substantially similar blur metrics need not be updated. If the blur metrics of any pixels or regions of pixels of images are determined to have changed, however, the blur image may be updated to reflect the changes in blur metrics for such pixels or regions and whether such blur metrics have changed.

In accordance with the present disclosure, a blur image determined based on blur metrics, and an updated blur image reflecting changes in the blur metrics, may be helpful in selecting which pixel sensors of an imaging sensor should be digitized, and in which order, or at which frequencies or rates, when images or frames are subsequently captured, e.g., during the filming of moving images using an imaging device such as a digital camera. Pixel sensors corresponding to regions of image pixels within high blur metric regions of a blur image may be shuttered or digitized before, or more frequently than, pixel sensors corresponding to regions of image pixels within low blur metric regions of the blur image. Such a technique may increase the frame rate of a global shuttering camera or other imaging device and reduce the incidence of blur artifacts resulting from the motion of a subject within a field of view of the camera or other imaging device. Such techniques further enhance the autofocusing capacity of cameras or other imaging devices, in that regions of interest within a scene may be automatically identified based on changes in their levels of blur or sharpness, and one of more components of an imaging device may be manually or automatically adjusted in order to modify the level of focus in such regions and rates at which such regions are shuttered or digitized. Additionally, by shuttering or digitizing pixel sensors at different rates or times based on the content of previously captured imaging data, pixel sensors corresponding to regions of image pixels within low blur metric regions of a blur image may be shuttered for longer durations, thereby enabling high levels of richness, intensity and quality of imaging data subsequently captured by such pixel sensors to be maintained.

In this regard, the systems and methods of the present disclosure enable imaging devices to mimic the human eyes, which capture and evaluate reflected light in response to several small movements, known as saccades or saccadic eye movements. In a human eye, a fovea includes tens of thousands of photoreceptors that change their position every two hundred to three hundred milliseconds, and saccadic eye movements may redirect the fovea of a retina from one point of interest to another at a rate of approximately three to four movements per second. By some estimates, saccades occur in most humans three to four times per second. Such movements enable a human eye to capture data not only from a fovea having a width of a handful of degrees but also from a visual field of view of approximately two hundred degrees (200°). Similarly, the systems and methods of the present disclosure may monitor an entire field of view of an imaging device by shuttering and digitizing pixel sensors corresponding to regions of the field of view with high levels of blur (e.g., relatively higher rates of movement or change) than regions of the field of view with low levels of blur (e.g., relatively lower rates of movement or change).

The systems and methods of the present disclosure may be utilized in connection with any number of imaging applications, and may thus improve upon the limited frame rates of imaging devices or sensors having global shutter architectures (e.g., CMOS-based systems) while minimizing or eliminating motion-based blurring experienced during the use of imaging devices or sensors having rolling shutter architectures (e.g., CCD-based systems). For example, in an environment in which imaging data is captured from objects that are regularly observed to be in motion, such as objects (e.g., parcels, boxes, containers or the like) in motion on conveyor belts or other conveying systems associated with or within a fulfillment center, the systems and methods of the present disclosure may be used to determine which pixels of imaging data are sufficiently blurry or sharp, and which are not, and direct the digitization of pixel sensors based on the content thereof.

Figure 2:
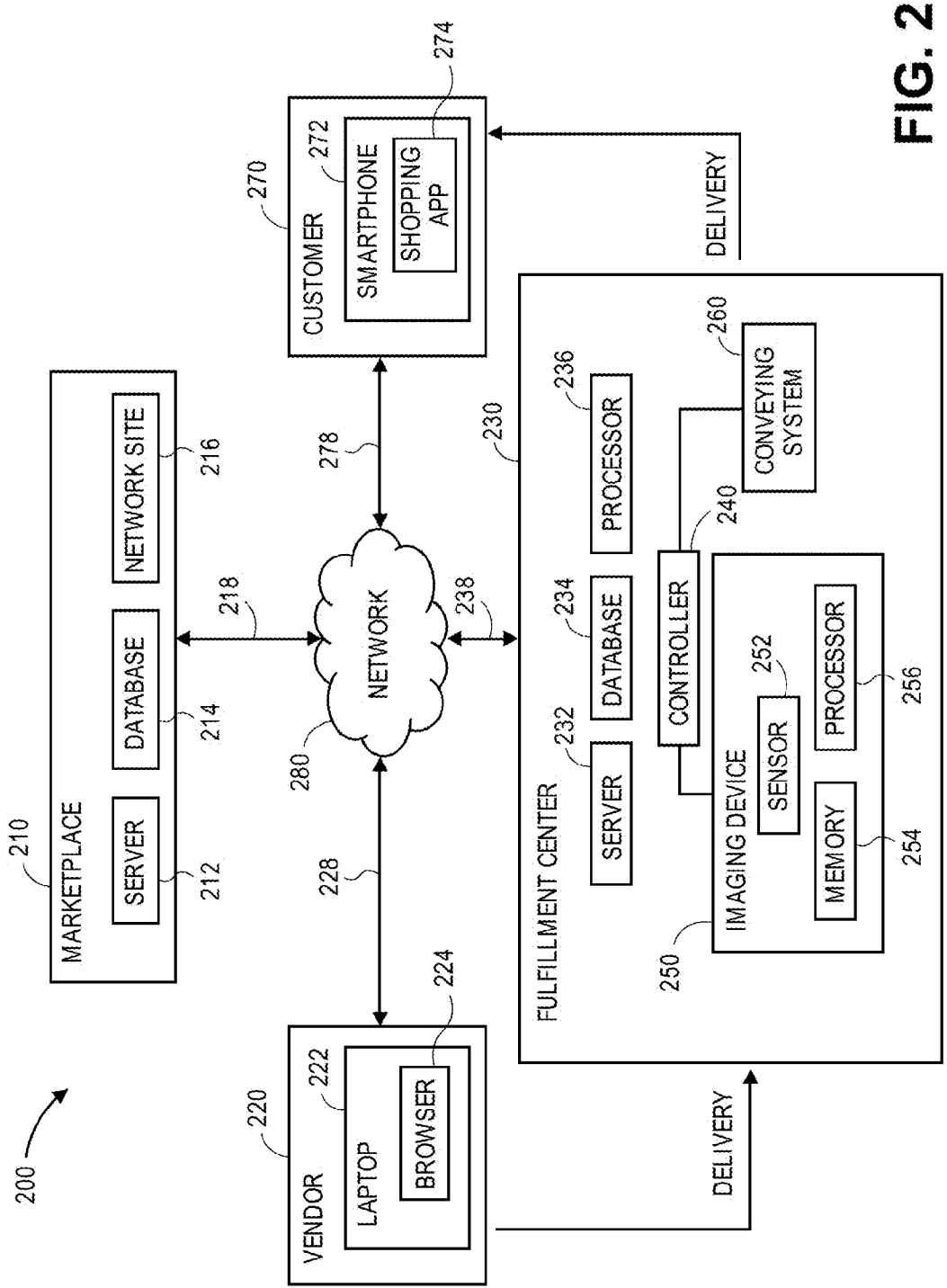
FIG. 2 is a block diagram of components of one system for focus-based shuttering in accordance with embodiments of the present disclosure.

Referring to FIG. 2, a block diagram of components of one system 200 for focus-based shuttering in accordance with embodiments of the present disclosure is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources (e.g., manufacturers, merchants, sellers or vendors, such as the vendor 220) available for download, purchase, rent, lease or borrowing by customers using a networked computer infrastructure, including one or more physical computer servers 212 and databases (or other data stores) 214 for hosting a network site (e.g., a web site) 216. The marketplace 210 may be physically or virtually associated with one or more storage or distribution facilities, including but not limited to the fulfillment center 230. The network site 216 may be implemented using the one or more servers 212, which connect or otherwise communicate with the one or more databases 214 as well as the network 280, as indicated by line 218, through the sending and receiving of digital data. The servers 212 may cause the display of information associated with the network site 216 in any manner, e.g., by transmitting code such as Hypertext Markup Language (HTML), over the network 280 to another computing device that may be configured to generate and render the information into one or more pages and to display such pages on a computer display of any kind. Moreover, the database 214 may include any type of information regarding items that have been made available for sale through the marketplace 210, or ordered by customers from the marketplace 210, including but not limited to names and/or images of items; prices of the items; item numbers, part numbers or other identifiers for the items; dimensions or features of the items; as well as customer ratings or reviews of the items, or any data regarding such customers.

The vendor 220 may be any entity or individual that intends to make one or more items available to customers, such as the customer 270, by way of the marketplace 210. The vendor 220 may operate one or more order processing and/or communication systems using a computing device such as a laptop computer 222 (as well as a tablet computer, a smartphone, a desktop computer or any other type or form of computing device) and/or software applications such as a browser (e.g., a web browser) 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230, or to the customer 270 or other destinations (not shown). Additionally, the vendor 220 may receive one or more items from manufacturers, merchants, sellers or other vendors (not shown), and may deliver one or more of such items to locations designated by the marketplace 210, such as the fulfillment center 230, for fulfillment and distribution to customers, or to the customer 270 directly. Furthermore, the vendor 220 may perform multiple functions. For example, the vendor 220 may also be a manufacturer, a merchant or a seller of one or more other items, and may also offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be, or may be operated by, a manufacturer, a merchant, a seller or a vendor.

The fulfillment center 230 may be any facility that is adapted to receive, store, process and/or distribute items on behalf of the marketplace 210. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236, that may be provided in the same physical location as the fulfillment center 210, or in one or more alternate or virtual locations, e.g., in a "cloud"-based environment. The fulfillment center 230 may also include stations for receiving, storing and distributing items to customers, such as one or more receiving stations, storage areas and distribution stations. The fulfillment center 230 further includes a computer-based controller 240, an imaging device 250 and a conveying system 260 having at least one conveyor (e.g., a conveyor belt).

The controller 240 may be any type or form of electronic device or system configured to control the operation of one or more of the imaging device 250 and/or the conveying system 260, or any other aspect of operations within the fulfillment center 230. The controller 240 may be in communication with one or more workers within the fulfillment center 230, or the various facilities and other components of the fulfillment center 230. The controller 240 may also be associated with one or more other computing devices or machines, and may communicate with the marketplace 210, the vendor 220 or the customer 270 over the network 280, as indicated by line 238, through the sending and receiving of digital data.

The controller 240 may generate instructions or commands based on information received from the imaging device 250 or the conveying system 260, or information received from the server 232, the processor 236, or any other external computing device via the network 280. For example, the controller 240 may transmit one or more control signals to components associated with one or more aspects of the imaging device 250 or the conveying system 260, including but not limited to components for repositioning or reorienting the imaging device 250, or components for causing the operation of one or more aspects of the conveying system 260, e.g., one or more conveyor belts, at a fixed or adjustable linear speed. Thus, in response to such control signals, an item may be placed onto the conveying system 260, and imaging data regarding the item may be captured using the imaging device 250. The controller 240 may be associated with any form of motors, power sources or other components for operating the various machines or apparatuses within the fulfillment center 230, including but not limited to the imaging device 250 or various aspects of the conveying system 260.

The imaging device 250 may be any form of optical recording device that may be used to photograph or otherwise record imaging data of structures, facilities or other elements within the fulfillment center 230, as well as the items within the fulfillment center 230, or for any other purpose. As is shown in FIG. 2, the imaging device 250 may include one or more sensors 252, memory or storage components 254 and processors 256, and such sensors, memory components or processors may further include one or more photosensitive surfaces, filters, chips, electrodes, clocks, boards, timers or any other relevant features (not shown). Such imaging devices 250 may capture imaging data in the form of one or more still or moving images of any kind or form, as well as any relevant audio signals or other information, within one or more designated locations within the fulfillment center 230, and may be connected to the server 232 or with one another by way of a wired or wireless connection that may be dedicated or comprise all or part of an internal network (not shown). Additionally, the imaging device 250 may be adapted or otherwise configured to communicate with the marketplace 210 or the marketplace server 212, the vendor 220 or the vendor laptop 222 or the customer 270 or customer smartphone 272, or with one or more other imaging devices (not shown), or to access one or more other computer devices by way of the network 280. Although the fulfillment center 230 of FIG. 2 includes a single box corresponding to one imaging device 250, those of ordinary skill in the pertinent arts will recognize that any number or type of imaging devices may be provided in accordance with the present disclosure, including but not limited to digital cameras, depth sensors or range cameras, infrared cameras, radiographic cameras or other optical sensors.

The conveying system 260 may comprise one or more powered or powerless conveyors that are provided for transporting objects, items or materials of varying sizes and shapes, and include any number of machines or elements for causing the motion or translation of such objects, items or materials from one location to another. Any form of mover, including but not limited to belts, chains, screws, tracks or rollers, may drive such machines or elements and the objects, items or materials may be transported within such conveying systems in a container or carrier, or on or within the mover itself. Such machines or elements may further include one or more pulleys, shafts, hubs, bushings, sprockets, bearings and other elements for causing a movement of a conveyor. Further, the conveying system 260 may convey objects, items or materials into one or more static or dynamic conveying apparatuses, which may include one or more machines or elements such as a bin, a chute, a cart, a truck or another like apparatus.

The fulfillment center 230 may also include one or more workers (not shown), who may be any designated personnel tasked with performing one or more tasks within the fulfillment center 230. Such workers may handle or transport items (e.g., any type or form of good, product, media or other tangible consumer article) within the fulfillment center 230, or operate one or more pieces of equipment therein (not shown). The workers may also operate one or more specific computing devices or machines for registering the receipt, retrieval, transportation or storage of items within the fulfillment center 230, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices. The fulfillment center 230 may further include one or more autonomous or semi-autonomous machines, vehicles or mobile robots (not shown) for performing one or more of the tasks traditionally associated with human workers, including but not limited to the tasks referenced above.

The fulfillment center 230 may operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities, for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones). Alternatively, an item received at a receiving station of the fulfillment center 230 may be transferred directly to a distribution station for further processing, or "cross-docked," without first being placed into storage in an intermediate storage area.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," or a "customer," or like terms, may be automated steps performed by their respective computer systems, or implemented within software modules (or computer programs) executed by one or more general purpose computers. Moreover, those of ordinary skill in the pertinent arts would recognize that references to process steps or actions described herein as being performed by or relating to a "vendor" could also be performed by or relate to a manufacturer, a merchant or a seller, or another source of items. Those of ordinary skill in the pertinent arts would also recognize that process steps described as being performed by a "marketplace," a "vendor," a "fulfillment center," or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
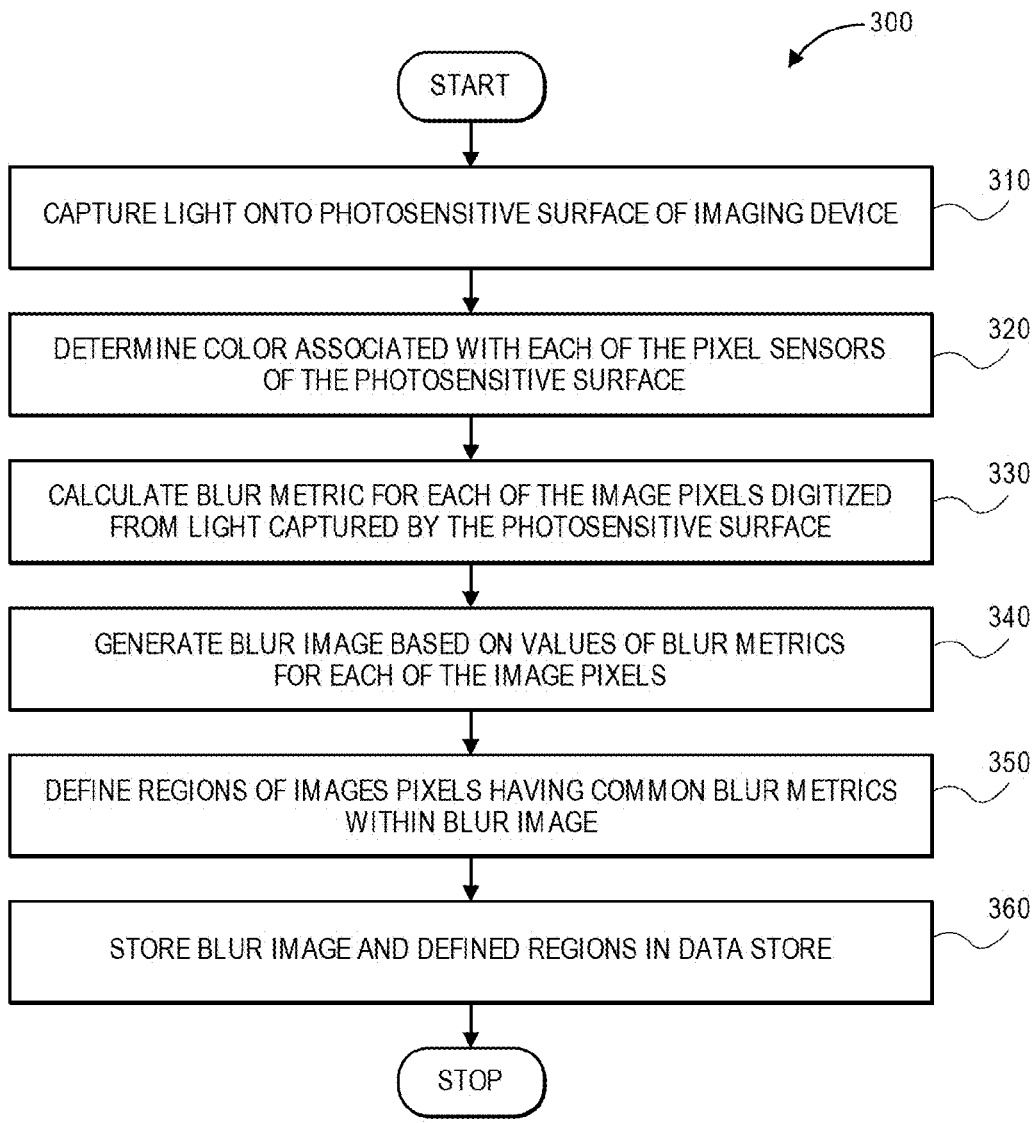
FIG. 3 is a flow chart of one process for focus-based shuttering in accordance with embodiments of the present disclosure.

As is discussed above, the systems and methods of the present disclosure may be directed to determining blur metrics and generating blur images based on such metrics. Once generated, such blur metrics and blur images may be utilized for any purpose. Referring to FIG. 3, a flow chart 300 representing one embodiment of a process for focus-based shuttering in accordance with embodiments of the present disclosure is shown.

At box 310, light is captured onto a photosensitive surface of an imaging device. The photosensitive surface may be a CMOS image sensor or component thereof, a CCD image sensor or component thereof, or any other type or form of image sensor or component thereof having a plurality of pixel sensors as well as amplifiers, switches, gates or any other relevant components for controlling exposure of the pixel sensors to light and the conversion of charges or analog signals associated with such exposure to digital signals. At box 320, a color associated with light captured by each of the pixel sensors of the photosensitive surface is determined. For example, a pixel sensor may be processed to determine one or more components associated with an analog signal corresponding to the captured incident light, e.g., values corresponding to levels of red, green and blue of a color signal, or, alternatively, a value corresponding to a level of gray of a grayscale signal.

At box 330, a blur metric for each of the image pixels digitized from light captured by the photosensitive surface is calculated. The blur metric may be any measure, value, calculation or estimate indicative of the extent to which an image pixel is blurry or sharp, and may be determined based on information or data regarding the color associated with the pixel sensors as determined at box 320, or the colors associated with one or more other pixel sensors surrounding the pixel sensor. Such information or data may include the values of red, blue, green or grayscale components, as well as any hues (e.g., a relative color shade), saturations (e.g., a relative intensity) or brightness (e.g., a relative lightness) of such pixels, or any other relevant information or data.

At box 340, a blur image is generated based on the values of the blur metric for each of the image pixels. The blur image may be a table or an array, similar to a representation of a color or grayscale image, containing the values of the blur metrics determined at box 330 for each of the image pixels. At box 350, regions of image pixels having common or substantially similar blur metrics are defined within the blur image. For example, such regions may be aggregated into the form of a contour map and one or more boundaries may be defined, where necessary, to delineate between respective regions in a manner substantially similar to the formation of a contour map or topographical profile. At box 360, information or data regarding the blur metric and the one or more defined regions are stored in at least one data store, and the process ends. For example, the blur image may be stored independently or in association with a color image defined by the colors determined at box 320, or in association with any other information, data or metadata.

Figures 4A, 4B:
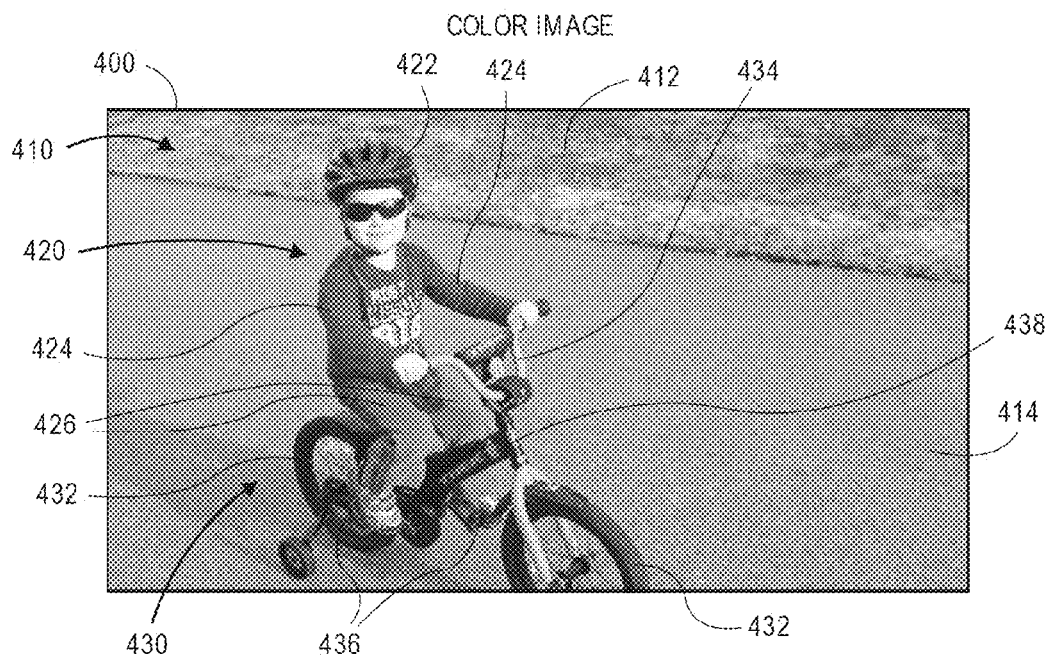
FIG. 4A, FIG. 4B and FIG. 4C are views of aspects of one process for focus-based shuttering in accordance with embodiments of the present disclosure.
Figure 4C:
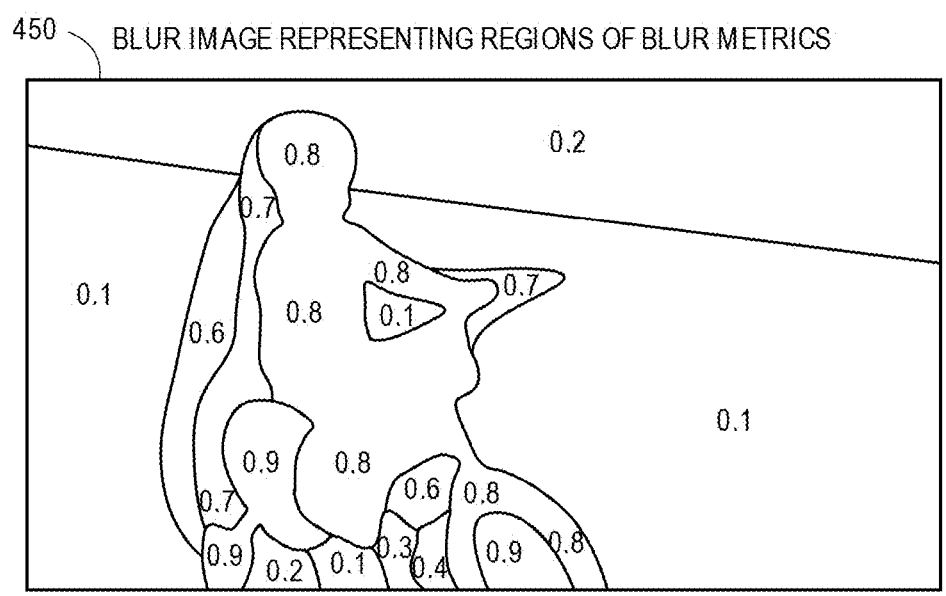

One example of the determination of blur metrics and the generation of a blur image is shown in FIGS. 4A, 4B and 4C. Referring to FIG. 4A, a color image 400 of a scene 410 is shown. Except where otherwise noted, reference numerals preceded by the number "4" shown in FIG. 4 indicate components or features that are similar to components or features having reference numerals preceded by the number "1" shown in FIGS. 1A through 1F.

As is shown in FIG. 4A, the scene 410 includes an actor 420 (viz., a child) and an object 430 (viz., a bicycle). The actor 420 and the object 430 are shown among background features 412, 414 including flora 412 (e.g., grass) and a surface feature 414 (e.g., a driveway). The actor 420 comprises a head 422, a pair of arms 424 and a pair of legs 426. The actor 420 is seated on the object 430, which comprises a pair of wheels 432, a set of handlebars 434, a pair of pedals 436 and a frame 438.

In accordance with the present disclosure, blur metrics may be calculated for pixels, or for regions of pixels, within a digital image based on the extent to which such pixels or regions thereof are blurry or sharp according to any number of algorithms, techniques, machine learning systems or classifiers. For example, a variance of absolute values of a Laplacian operator may be used to calculate a descriptor of a level of blur (or sharpness) of the image based on second-order derivatives to capture high spatial frequencies associated with sharp edges or features of an image, or to convolve the image and calculate a descriptor of the level of blur (or sharpness) of the image based on a sum of the resultant absolute values over a window of defined pixel dimensions. Alternatively, a descriptor of a level of blur (or sharpness) of the image may be determined using a Tenengrad operator, a Sobel operator, a modified Tenengrad operator, or any other blur detection algorithms, techniques, machine learning systems or classifiers, e.g., based on the image pixel and one or more surrounding image pixels, including but not limited to identifying one or more edges or other features within the image and measuring the extent to which the edges are blurry or sharp. Any other system or method for determining an extent of blur or sharpness in an image may be utilized in order to derive a blur metric in accordance with the present disclosure.

Referring to FIG. 4B, an array 425 of blur metrics for the color image 400 of FIG. 4A is shown. The array 425 indicates that blur metrics are substantially high in regions of fast movement of the actor 420 or the object 430 within the image. For example, as is shown in the array 425, the highest values of the blur metrics are those associated with the most rapidly moving aspects of the color image 400 of FIG. 4A, including the wheels 432, which include a plurality of spokes and are shown as rotating about an axle. Some of the next-highest values of the blur metrics are those associated with the movements of the actor 420, e.g., the head 422, the arms 424, which are shown as operating the handlebars 434, or the legs 426, which are shown as pushing on the pedals 436, in order to cause the movement of the object 430, and the frame 438 of the object 430. The background features of the scene 410, including but not limited to the flora 412 or the surface feature 414, are shown as having substantially lower blur metrics than the portions of the color image 400 corresponding to the actor 420 or the object 430, however.

Once the blur metrics have been derived for each of the image pixels, or for regions of such pixels, a blur image may be generated based on the values of such metrics. Referring to FIG. 4C, a blur image 450 is shown. The blur image 450 of FIG. 4C indicates that regions of commonly high blur metrics (viz., values of 0.8 or 0.9) are provided about the wheels 434, as well as in association with the actor 420, while regions of commonly low blur metrics (viz., values of 0.1 or 0.2) are provided in the background features of the scene 410. The effects of the movement of the actor 420 and the object 430 also lead to substantially blurry regions along trailing edges of the actor 420 and the object 430, as well, as blur metrics having values less than the blur metrics of the moving actor 420 and object 430 but greater than the blur metrics of the background features of the scene 410 (viz., values of 0.6 and 0.7) are observed along such trailing edges.

Figure 5:
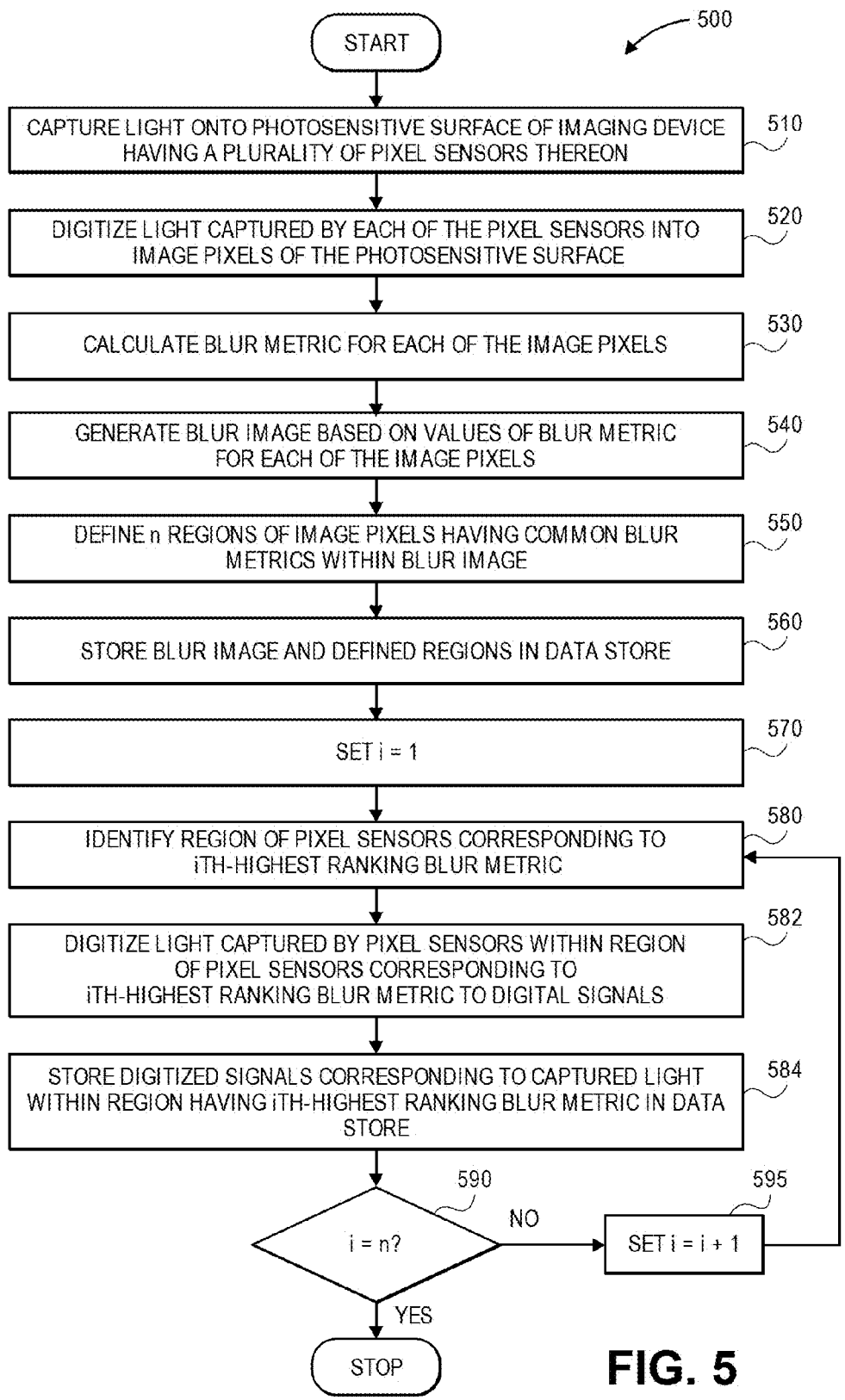
FIG. 5 is a flow chart of one process for focus-based shuttering in accordance with embodiments of the present disclosure.

In accordance with the present disclosure, once blur metrics are determined and/or a blur image identifying one or more regions of common or substantially similar blur metrics is derived, the blur metrics and/or the blur image may be utilized for any purpose. For example, pixel sensors corresponding to regions of a blur image having comparatively or relatively high blur metrics may be shuttered or digitized more frequently or for shorter durations, while pixel sensors corresponding to regions of the blur image having comparatively or relatively low blur metrics may be shuttered or digitized less frequently or for longer durations. Additionally, as is discussed above, blur metrics and/or a blur image may be used to determine an order or sequence in which pixel sensors of an imaging device are digitized based on the extent of blur or sharpness of image pixels captured using such sensors. Referring to FIG. 5, a flow chart 500 representing one embodiment of a process for focus-based shuttering in accordance with embodiments of the present disclosure is shown.

At box 510, light is captured onto a photosensitive surface of an imaging device, e.g., a CMOS-based sensor, a CCD-based sensor, or any other form of imaging sensor, having a plurality of pixel sensors thereon. At box 520, light captured by each of the pixel sensors is digitized into image pixels. For example, information regarding a color (e.g., values corresponding to red, green and blue of a color signal, or a gray of a grayscale signal) associated with each of the pixel sensors of the photosensitive surface may be determined and stored.

At box 530, a blur metric is calculated for each of the image pixels. The blur metric may be calculated according to any method or technique for determining an extent of blurriness or sharpness of an image pixel, including but not limited to outputs of one or more Laplacian operators, Tenengrad operators, or like operators. At box 540, a blur image is generated based on the values of the blur metrics for each of the image pixels. For example, referring again to FIGS. 4B and 4C, the blur image 450 of FIG. 4C is generated based on the array 425 of blur metric values of FIG. 4B, in a manner similar to the generation of a contour map indicative of changes of elevation in a given geographic area.

At box 550, a plurality of n regions of image pixels having common or substantially similar blur metrics within the blur image are defined. Such regions may be defined to a predetermined degree or tolerance, e.g., based on groups or clusters of image pixels having common or substantially similar blur metrics. The regions may have any size or shape, and may contain or encompass any number of image pixels. At box 560, the blur image and the defined n regions are stored in a data store. For example, the blur image may be stored in association with color or grayscale information regarding the image pixels, with one or more coordinates or descriptors (e.g., equations) of lines or boundaries between respective regions, or with any other relevant information or data.

At box 570, a value of a step interval i is set equal to 1, and at box 580, a region of pixel sensors corresponding to the ith-highest ranking blur metric value is identified. For example, where a blur image includes ten regions of discrete blur metrics, a region of pixel sensors corresponding to the region of the blur image having the highest blur metric, e.g., corresponding to the region of image pixels having the most blur within the color image, may be identified. At box 582, light captured by pixel sensors within the region corresponding to the ith-highest ranking blur metric value is digitized into digital signals. For example, the charges resulting from the exposure of the pixel sensors within the region identified at box 580 to light may be transferred in series to an analog-to-digital converter and converted to binary signals. At box 584, the digitized signals corresponding to the captured light within the region having the ith-highest ranking blur metric are stored in a data store.

At box 590, whether the step variable i equals the total number n of regions of pixel sensors having common blur metrics identified at box 550 is determined. For example, where the blur image includes six regions of discrete blur metrics, whether light captured by pixel sensors within each of the six regions has been digitized is determined. If the step variable i is equal to the total number n of regions of pixel sensors, e.g., if the pixels of each of the regions of pixel sensors has been digitized, then the process ends. If the step variable i is not equal to the total number n of regions of pixels having common blur metrics, then the process advances to box 595, where the step variable i is incremented by 1, before returning to box 580, where the region of pixel sensors corresponding to the region of the blur image having the ith-highest ranking blur metric value is identified.

Figure 6A:
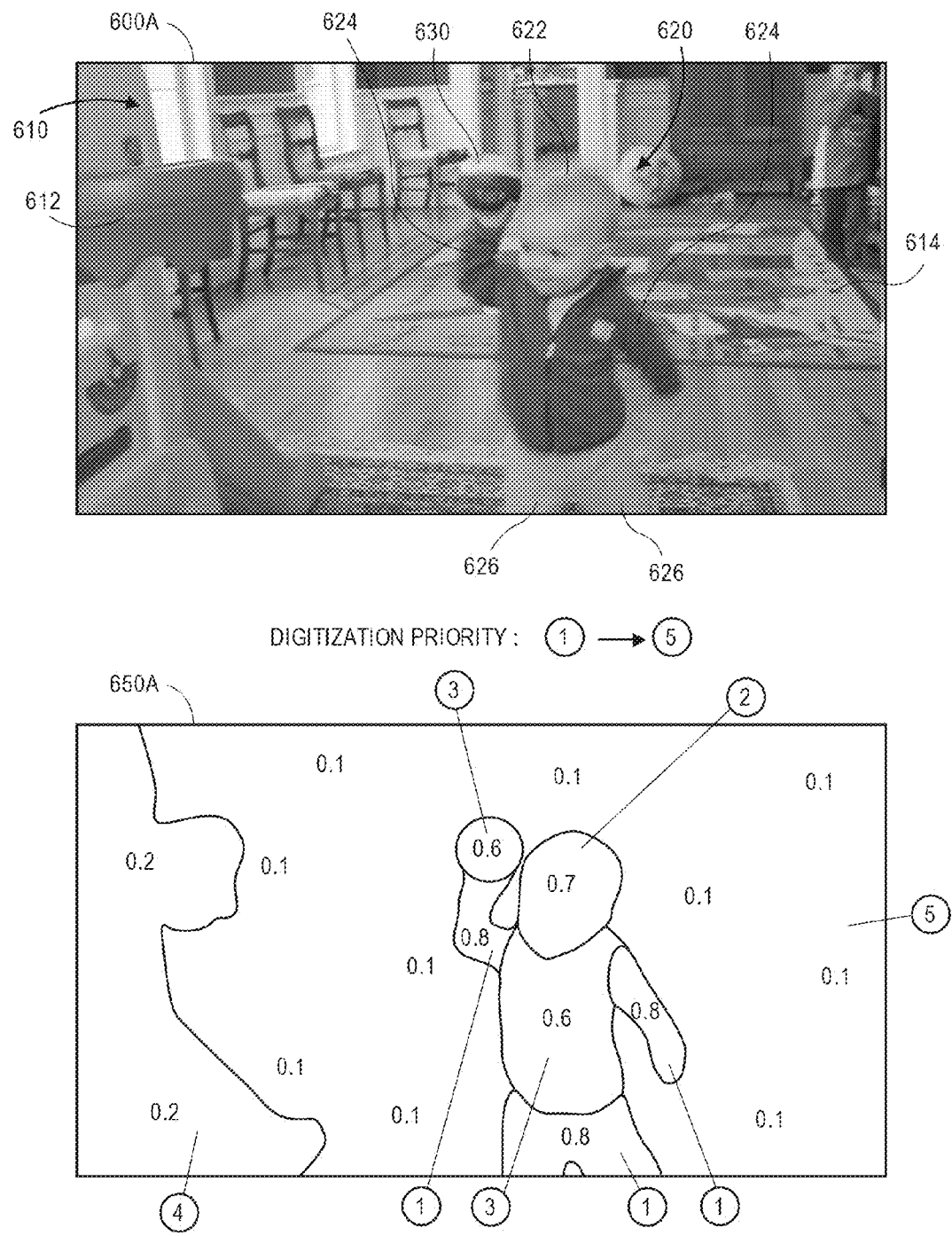
FIGS. 6A through 6E are views of imaging data associated with a system for focus-based shuttering in accordance with embodiments of the present disclosure.

One embodiment in which blur images may be used to determine a ranking or priority for digitizing pixel sensors is shown in connection to FIGS. 6A through 6E. Referring to FIG. 6A, a color image 600A and a blur image 650A generated based on blur metrics determined from the color image 600A are shown. Except where otherwise noted, reference numerals preceded by the number "6" shown in FIGS. 6A through 6E indicate components or features that are similar to components or features having reference numerals preceded by the number "4" shown in FIGS. 4A through 4C or by the number "1" shown in FIGS. 1A through 1F.

The color image 600A of FIG. 6A depicts a scene 610 including an actor 620 (viz., a child) and an object 630 (viz., a ball). The scene 610 further includes a foreground element 612 and a background 614. The actor 620 includes a head 622, a pair of arms 624 and a pair of legs 626. The actor 620 is manipulating the object 630. As is shown in FIG. 6A, the actor 620 is walking toward the foreground element 612 while carrying the object 630.

As is discussed above, the blur image 650A of the scene 610 is generated by determining blur metrics associated with image pixels of the color image 600A, and defining regions of image pixels corresponding to blur metrics of common or substantially similar blur metrics. Once such regions are defined, regions of pixel sensors corresponding to regions of the blur image having a high blur metric may be sampled at a higher rate or converted to digital signals at a higher level of priority than regions of pixels identified as having a low blur metric. For example, as is shown in FIG. 6A, pixel sensors corresponding to image pixels within the regions corresponding to the arms 624 and the legs 626 of the actor 620, which have the highest blur metrics (viz., blur metrics of 0.8, in regions of the blur image 650A marked with a numeral 1), may be converted to digital signals first, followed by pixel sensors corresponding to image pixels in the region corresponding to the head 622 of the actor, which has a blur metric of 0.7 (viz., in a region of the blur image 650A marked with a numeral 2), and pixel sensors corresponding to image pixels in the regions corresponding to the body of the actor 620 and the object 630, which have blur metrics of 0.6 (viz., in regions of the blur image 650A marked with a numeral 3). Thereafter, pixel sensors corresponding to image pixels in the regions corresponding to the foreground element 612 and the background, which have blur metrics of 0.2 and 0.1 (viz., regions of the blur image 650A marked with numerals 4 and 5), respectively, may be converted to digital signals.

Figure 6B:
Figure 6B:
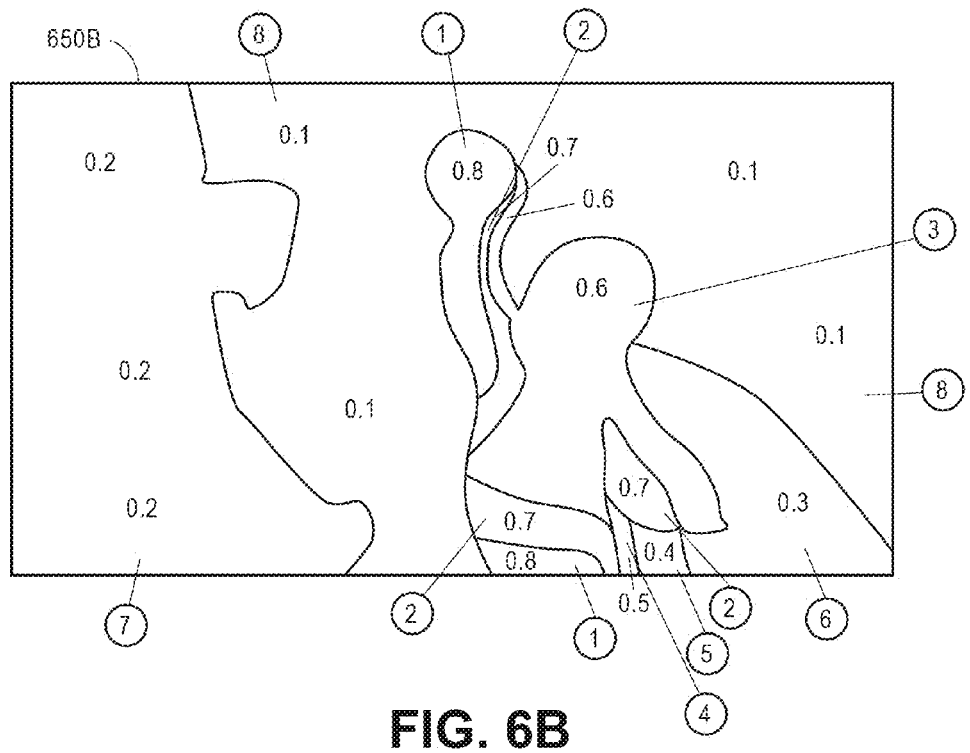

In accordance with the present disclosure, blur metrics and blur images generated based on such blur metrics may be updated over time. Referring to FIG. 6B, a color image 600B of the scene 610 and an updated blur image 650B of the scene 610 are shown. The color image 600B follows the color image 600A of FIG. 6A in sequence, and, in view of the changes in position of the actor 620 and the object 630 in the scene 610, the updated blur image 650B is generated based on blur metrics associated with the image 600B, from which regions of pixels corresponding to blur metrics of common or substantially similar values may be defined. The updated blur image 650B, and the regions thereof, may then be used to determine a digitization priority (e.g., order or sequence) for digitizing light captured by pixel sensors of the imaging device. For example, as is shown in FIG. 6B, image pixels within regions corresponding generally to the object 630, one of the arms 624 and the legs 626 of the actor 620 have the highest blur metrics (viz., blur metrics of 0.8, in regions of the blur image 650B marked with a numeral 1), while image pixels within regions corresponding to a trailing edge of the arm 624 and the object 630, or portions of the legs 624, have the next-highest blur metrics (viz., blur metrics of 0.7, in regions of the blur image 650B marked with a numeral 2). As is also shown in FIG. 6B, other regions of image pixels within the blur image 650B have decreasingly lower blur metrics (e.g., blur metrics ranging from 0.6 to 0.1, in regions of the blur image 650B marked with numerals 3 to 8).

Figure 6C:
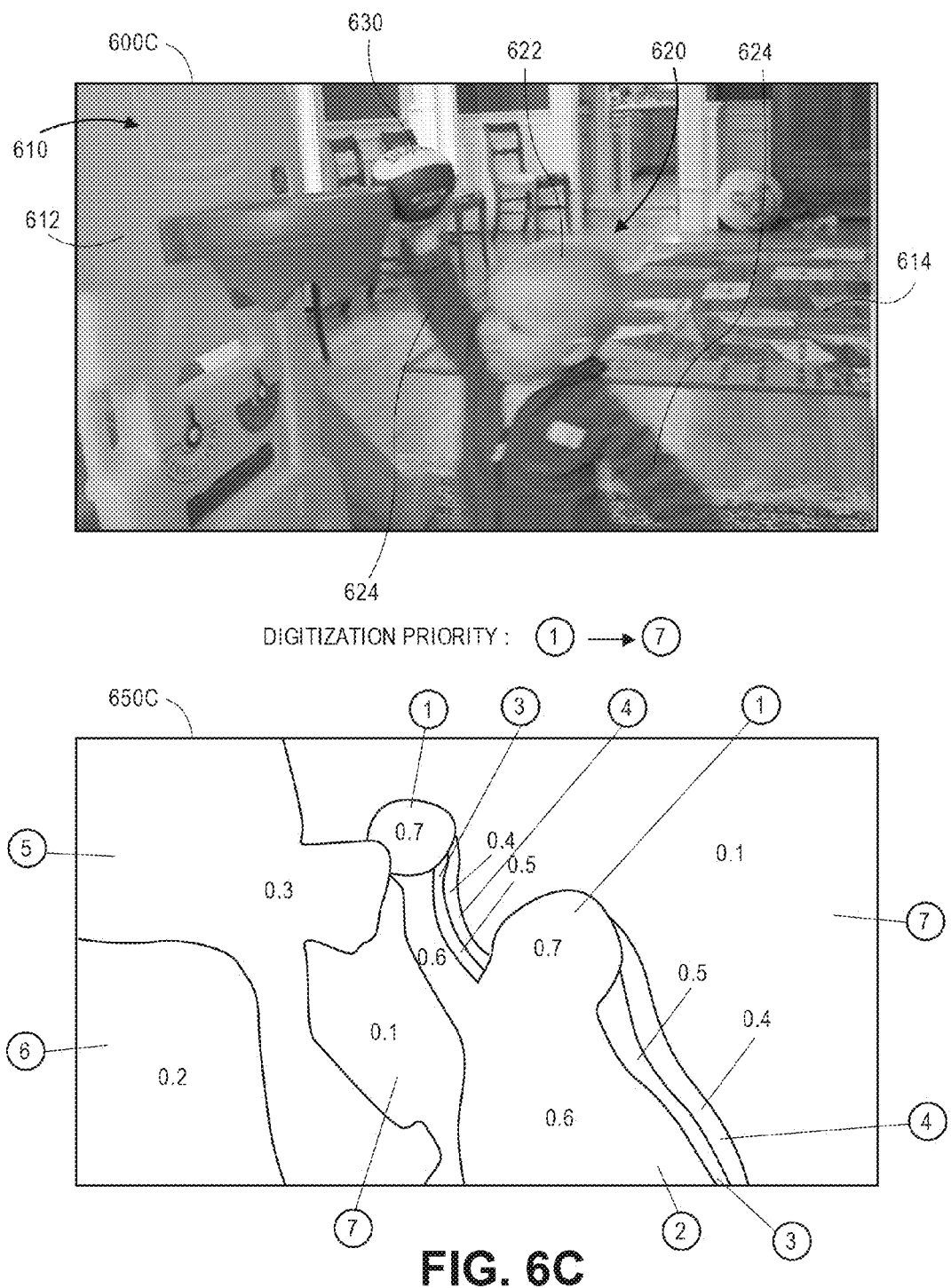
Figure 6D:
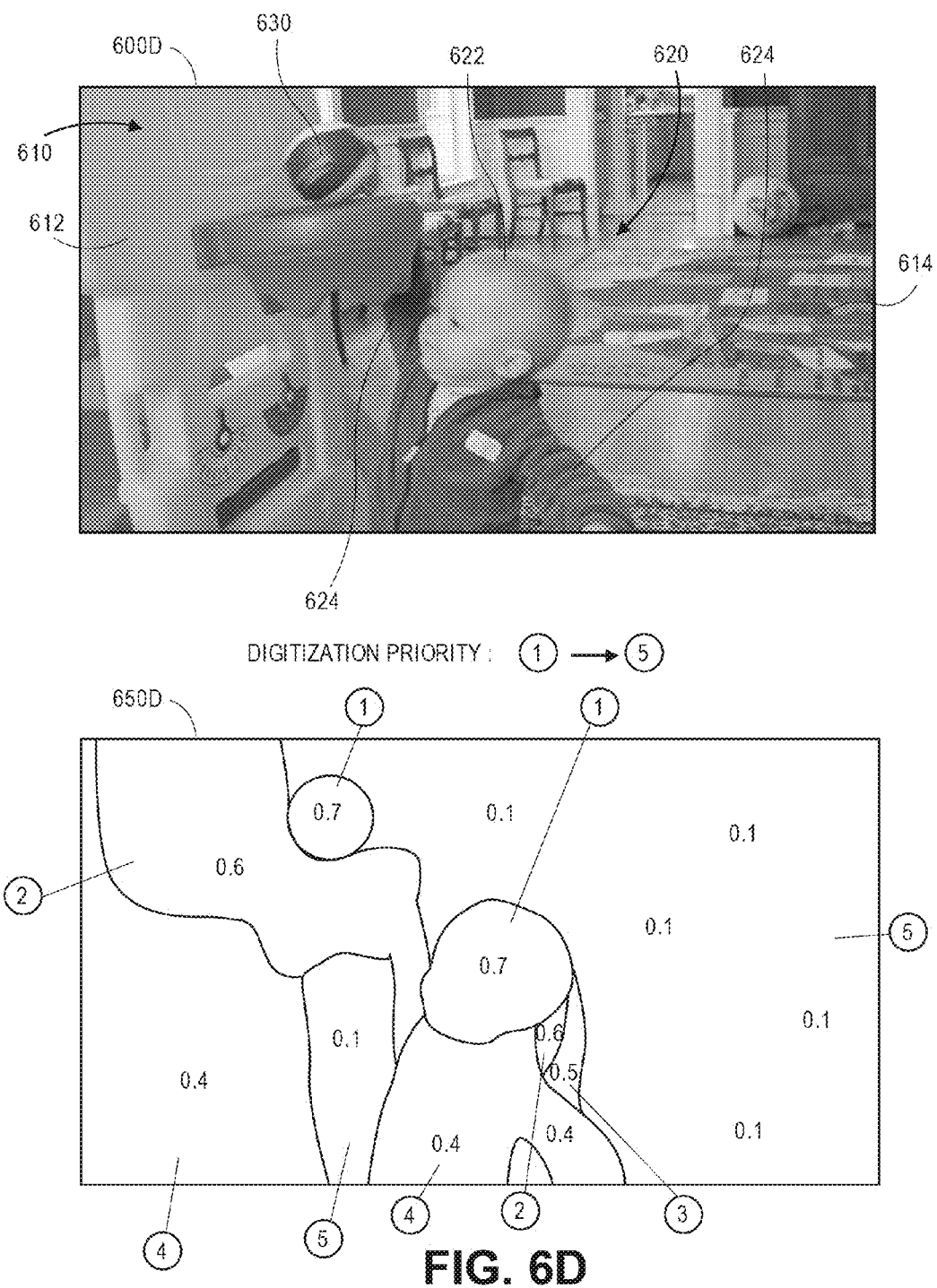
Figure 6E:
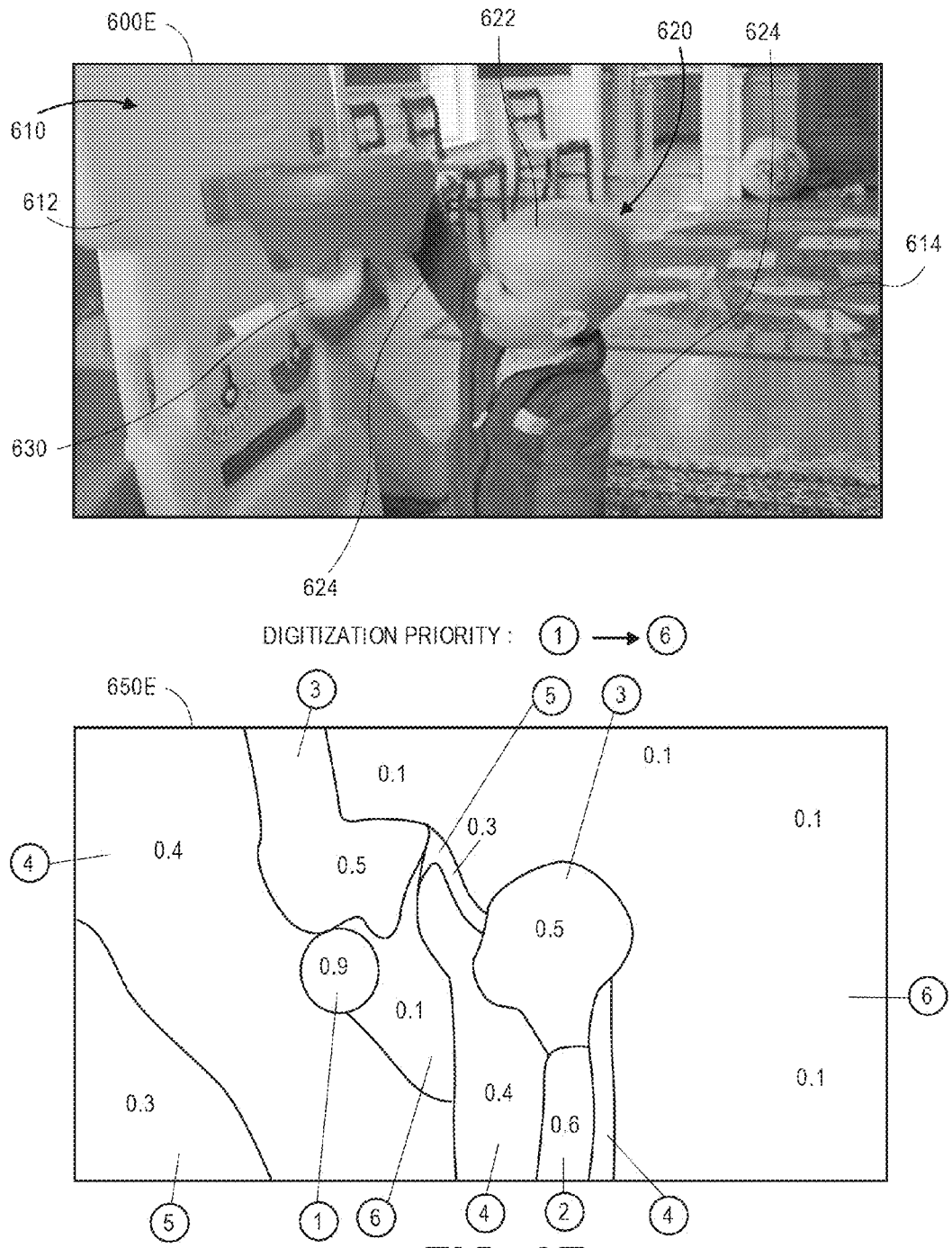

Likewise, referring to FIGS. 6C, 6D and 6E, color images 600C, 600D, 600E of the scene 610 and updated blur images 650C, 650D, 650E determined based on the color images 600C, 600D, 600E of the scene 610 are shown. The color images 600C, 600D, 600E follow the color image 600B in sequence, respectively, and, in view of the changes in the position of the actor 620 and the object 630 in the scene 610, as expressed in the color images 600C, 600D, 600E, the updated blur images 650C, 650D, 650E may be generated based on blur metrics associated with the color images 600C, 600D, 600E, from which regions of pixels corresponding to blur metrics of common or substantially similar values may be defined. The updated blur images 650C, 650D, 650E, and the regions thereof, may then be used to determine a priority according to which pixel sensors corresponding to such regions may be digitized.

Blur metrics, and blur images generated based on such blur metrics, may be used to prioritize the digitization of light captured by pixel sensors either alone or in combination with any other intrinsic or extrinsic information or data. For example, a priority for digitizing pixel sensors of an imaging device may be determined based on not only blur metrics but also historical information or data regarding a scene in which the imaging device is provided, or a predetermined schedule for digitizing such pixel sensors.

Additionally, or alternatively, in accordance with the present disclosure, blur metrics and/or a blur image identifying one or more regions of common or substantially similar blur metrics may be used to determine shuttering or digitization rates for pixel sensors, or regions or groups of pixel sensors, based on the content of imaging data previously captured by such pixel sensors. In some embodiments, regions of pixel sensors corresponding to image pixels expressing high levels of blur may be shuttered and digitized at relatively high rates, in order to enhance the image quality and minimize the blur shown in subsequently captured images or frames. Conversely, regions of pixel sensors corresponding to image pixels expressing low levels of blur may be shuttered and digitized at relatively low rates, thereby enabling such pixel sensors to capture more light and for longer durations, resulting in imaging data having greater richness, saturation and brightness, and more intense colors, hues or shades.

For example, referring again to FIGS. 6A through 6E, frequencies or rates at which pixel sensors of an imaging device are digitized may be defined based on the respective regions of a blur image to which such pixel sensors correspond, or the relative values of blur metrics associated with such regions. As is shown in FIG. 6A, pixel sensors corresponding to regions having the highest blur metrics (viz., regions of the blur image 650A marked with the numeral 1) may be digitized at the highest frequencies or rates of all of the pixel sensors, such as each time that such pixel sensors are exposed to light, or at another frequency or rate. Pixel sensors corresponding to regions having the next-highest blur metrics (viz., regions of the blur image 650A marked with the numeral 2) may be digitized at the second-highest frequencies or rates of all of the pixel sensors, such as every other time that such pixel sensors are exposed to light, or at another frequency or rate. Pixel sensors corresponding to the three regions having the next-highest blur metrics (viz., regions of the blur image 650A marked with the numerals 3, 4 or 5) may be digitized at the third-highest, fourth-highest or fifth-highest frequencies or rates of all of the pixel sensors, such as every third, fourth or fifth time that such pixel sensors are exposed to light, or at other frequencies or rates. In this regard, the regions of the blur image 650A defined by the blur metrics determined from image pixels of the color image 600A may be used to determine which pixel sensors of the imaging device are digitized and, how frequently, when subsequently capturing other color images.

Furthermore, those of ordinary skill in the pertinent arts will recognize that the frequencies or rates at which specific pixel sensors, or regions of such pixel sensors, are digitized may be modified based on the extent of the blur or sharpness of imaging data subsequently captured using the imaging device. For example, where frequencies or rates for digitizing pixel sensors are defined based on the blur image 650A of FIG. 6A, and the color image 600B of FIG. 6B is subsequently captured using an imaging device, the blur image 650B of FIG. 6B may be generated based on blur metrics associated with the image 600B, and such frequencies or rates of digitization may be modified accordingly to reflect differences between the blur image 650A and the blur image 650B, or changes in the blur metrics determined based on the color image 600A and the color image 600B. Such frequencies or rates may be modified or updated on an iterative basis, e.g., where blur metrics are calculated and blur images are updated upon the capture of the color images 600C, 600D, 600E of FIGS. 6C through 6E.

Figure 7:
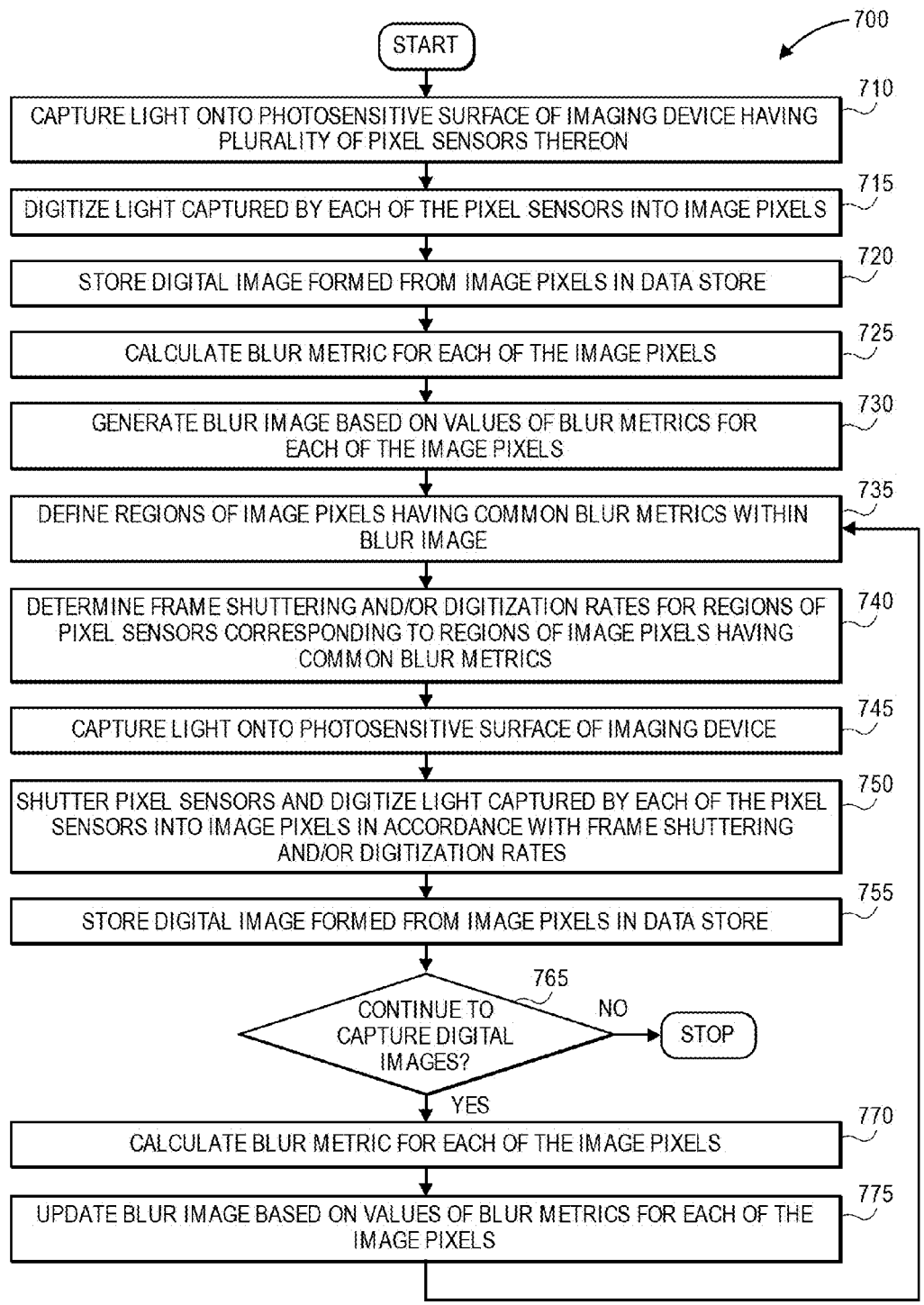
FIG. 7 is a flow chart of one process for focus-based shuttering in accordance with embodiments of the present disclosure.

Referring to FIG. 7, a flow chart 700 representing one embodiment of a process for focus-based shuttering in accordance with embodiments of the present disclosure is shown. At box 710, light is captured onto a photosensitive surface of an imaging device, e.g., a CMOS-based sensor, a CCD-based sensor, or another form of imaging sensor, having a plurality of pixel sensors provided thereon. At box 715, the light captured by each of the pixel sensors, e.g., analog signals corresponding to charges generated by the exposure of the pixel sensors, is digitized into image pixels.

At box 720, a digital image formed from the image pixels is stored in at least one data store. The digital image may be a color image (e.g., an RGB image), a grayscale image, a black-and-white image, or any other type or form of digital image. At box 725, a blur metric is calculated for each of the image pixels, and at box 730, a blur image is generated based on the values of the blur metrics for each of the image pixels. At box 735, a plurality of regions of image pixels having common blur metrics within the blur image are defined, e.g., to a predetermined degree or tolerance, and may include groups or clusters of pixels having common or substantially similar blur metrics. Such regions may have any size or shape, and may contain or encompass any number of image pixels.

At box 740, frame shuttering rates and/or digitization rates are determined for regions of the pixel sensors of the photosensitive surface corresponding to the regions of the image pixels having common blur metrics in the blur image. For example, the image pixels of the blur image that correspond to the various regions defined at box 735 may be mapped to the pixel sensors that captured light that was digitized into such pixels, and corresponding regions of pixel sensors may be defined accordingly. At box 745, light exposed onto the photosensitive surface is again captured, and at box 750, the pixel sensors of the imaging device are shuttered and digitized in accordance with the frame shuttering rates and/or digitization rates determined at box 740.

For example, in some embodiments, pixel sensors corresponding to regions of a previously captured image or frame having high blur, thereby indicating high degrees of movement or change, may be shuttered at higher rates than pixel sensors corresponding to regions of the previously captured image or frame having low blur, thereby indicating low degrees of movement or change. In some other embodiments, pixel sensors corresponding to regions of image pixels in a previously captured digital image having the highest blur metrics, and thus the highest levels of blur among such image pixels, may be digitized first in order, or at a highest frequency or rate. Pixel sensors corresponding to regions of image pixels in the previously captured digital image having the lowest blur metrics, and thus the lowest levels of blur among the image pixels, may be digitized last, or at a lowest frequency or rate. Alternatively, pixel sensors corresponding to regions of image pixels in a previously captured digital image having the lowest blur metrics, and thus the lowest levels of blur among the pixels, may be digitized first, e.g., at a highest frequency or rate, while pixel sensors corresponding to regions of image pixels in a previously captured digital image having the highest blur metrics, and thus the highest levels of blur among the image pixels, may be digitized last, e.g., at a lowest frequency or rate. Any order, sequence, level of priority, frequency or rate at which pixel sensors are to be digitized may be determined based on the blur metric values or the blur image, as such values or the blur image may be updated from time to time, in accordance with the present disclosure. At box 755, a digital image formed from the image pixels is stored in a data store.

At box 760, whether the continued recording of digital images using the imaging device is desired may be determined. If the recording of the digital images is no longer desired, then the process ends. If the recording of the digital images is desired, however, then the process advances to box 770, where blur metrics are calculated for each of the image pixels digitized at box 750, and to box 775, where the blur image is updated based on the values of such blur metrics as determined at box 770. The process then returns to box 735, where regions of image pixels having common blur metrics within the blur image are defined, and to box 740, where frame shuttering rates and/or digitization rates are determined for each of such regions.

Generating a blur image based on blur metric values, updating the blur image based on changes in the blur metric values, and utilizing the blur image, as updated, to determine rates or times at which subsequently exposed pixel sensors are to be digitized may be useful in a number of imaging applications. For example, where a series of still or moving images (e.g., frames) are captured, a blur image may be generated on blur metrics determined from one of the frames. Thereafter, pixel sensors corresponding to regions of the blur image where changes in the blur metrics are identified (e.g., due to movements of some foreground features) may be digitized at a higher priority level, or at a higher sampling rate. Conversely, pixel sensors corresponding to regions of the blur image where no changes in blur metrics (or insignificant changes in blur metrics) are identified need not be digitized, or may be digitized at a lower priority level, or at a lower sampling rate. The systems and methods of the present disclosure may enable pixel sensors where high levels of blur are observed to be shuttered and digitized at sufficiently high frame rates, thereby removing the levels of blur in subsequently captured images or frames, while enabling pixel sensors where low levels of blur are observed to be shuttered and digitized at sufficiently low frame rates, thereby enabling such pixel sensors to capture light for longer exposure times, thereby resulting in richer and more intense color data for such regions.

Referring to FIGS. 8A through 8E, color images 800A, 800B, 800C, 800D, 800E of a scene 810 are shown. Except where otherwise noted, reference numerals preceded by the number "8" shown in FIGS. 8A through 8E indicate components or features that are similar to components or features having reference numerals preceded by the number "6" shown in FIGS. 6A through 6E, by the number "4" shown in FIGS. 4A through 4C or by the number "1" shown in FIGS. 1A through 1F.

Figure 8A:
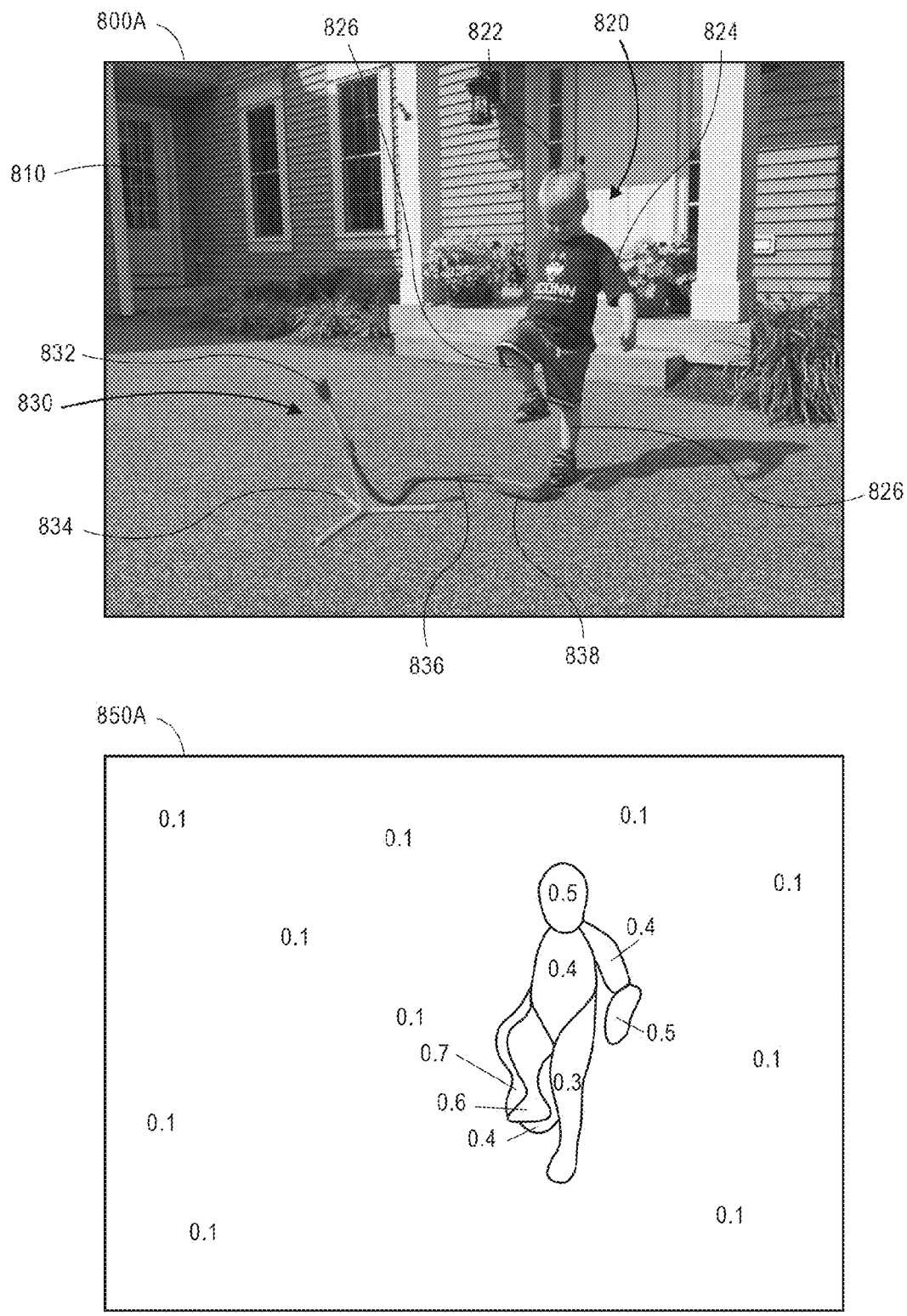
FIGS. 8A through 8E are views of imaging data associated with a system for focus-based shuttering in accordance with embodiments of the present disclosure.

As is shown in FIG. 8A, the color image 800A shows the scene 810 as including an actor 820 (viz., a child) and a plurality of foreground objects 830 (viz., a toy rocket launcher). The actor 822 includes a head 822, a pair of arms 824 and a pair of legs 826. The plurality of foreground objects 830 includes a rocket 832, a launcher 834, a hose 836 and a bladder 838.

As is shown in FIG. 8A, a blur image 850A representing blur metrics calculated based on the color image 800A is shown. The blur image 850A includes regions of elevated blur metric levels ranging from 0.3 to 0.7 corresponding to the head 822, the arms 824, the legs 826 and other portions of the actor 820 as shown in the color image 800A. As is also shown in the color image 800A of FIG. 8A, the actor 820 is raising one of his legs 826 above the bladder 838. Thus, as is shown in the blur image 850A of FIG. 8A, portions of the color image 800A corresponding to the leg 826 raised above the bladder 838 have comparatively high blur metrics (e.g., blur metrics of 0.6 and 0.7), while other portions of the color image 800A corresponding to the actor 820 have moderate blur metrics (e.g., blur metrics of 0.3 to 0.5). As is also shown in the blur image 850A of FIG. 8A, background portions of the scene 810 include comparatively low blur metrics (e.g., blur metrics of 0.1) and are shown as substantially clear within the color image 800A.

As is discussed above, blur metrics calculated based on attributes (e.g., color or grayscale components, hue, shade, saturation, intensity, brightness) of a color image, or a blur image derived based on such blur metrics, may be useful in processing subsequently captured imaging data. For example, where regions of pixel sensors of an imaging device are identified as corresponding to image pixels having high levels of blur, changes within such image pixels (e.g., due to motion of one or more subjects) may be implied, and such regions of pixel sensors may be digitized at higher rates. Where regions of pixel sensors of the imaging device are identified as corresponding to image pixels having low levels of blur, or no blur at all, it may be understood that such regions of pixel sensors remain unchanged or have minimum levels of change, and that such regions of pixel sensors may be digitized at lower rates, or need not be digitized at all.

Figure 8B:
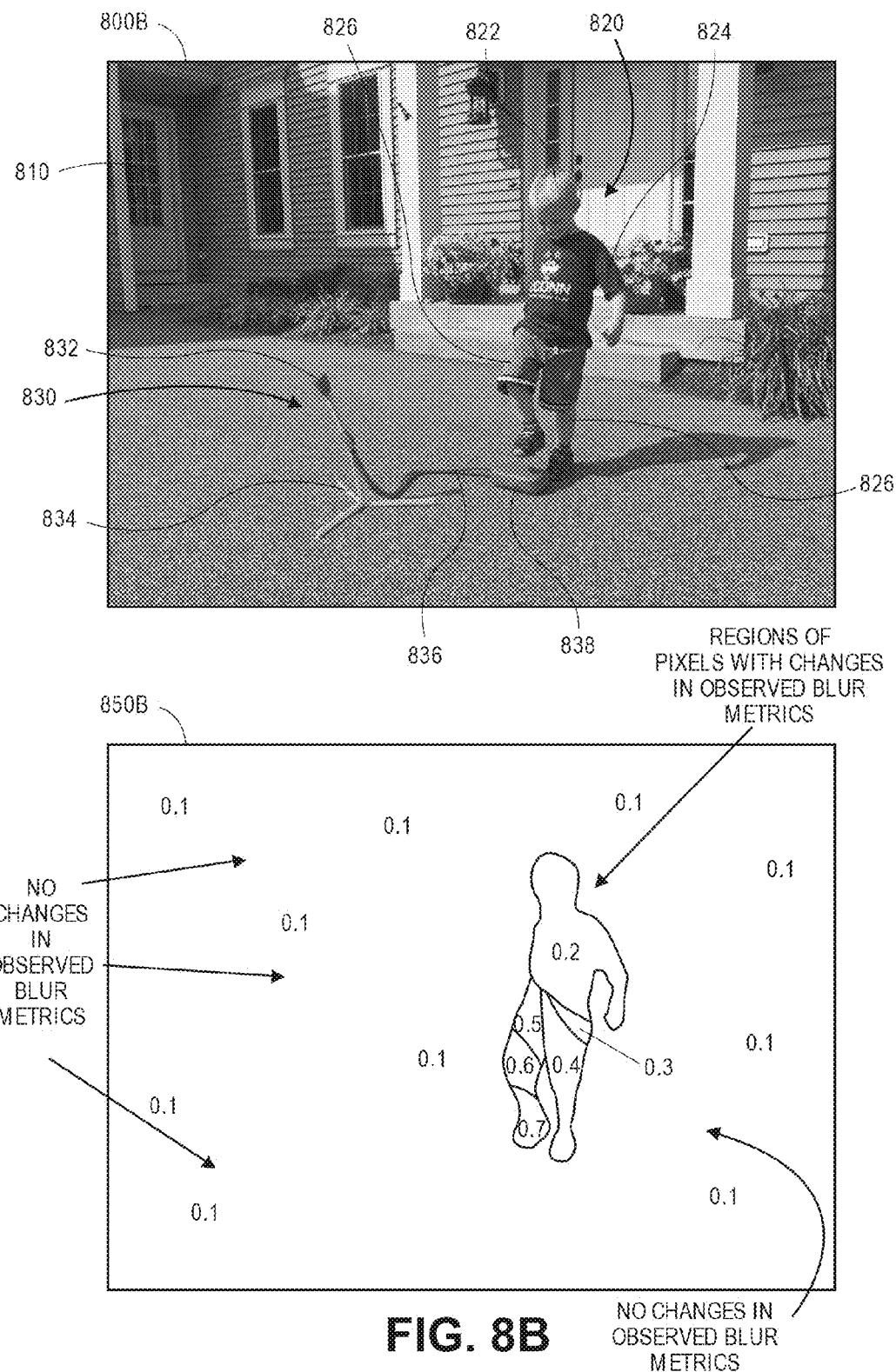

Referring to FIG. 8B, a color image 800B of the scene 810 and an updated blur image 850B generated based on the color image 800B are shown. The color image 800B shows the actor 820 continuing to depress one of his legs 826 vertically downward toward the bladder 838. Thus, as is shown in the updated blur image 850B of FIG. 8B, portions of the color image 800B corresponding to the leg 826 above the bladder 838 have comparatively high blur metrics (e.g., a particularly high blur metric of 0.7 within a vicinity of a foot, with descending blur metrics of 0.3 to 0.6 on the remainder of the legs 826). As is also shown in the updated blur image 850B, other portions of the color image 800B, e.g., background features of the scene 810, include blur metrics that remain both low and unchanged.

Figure 8C:
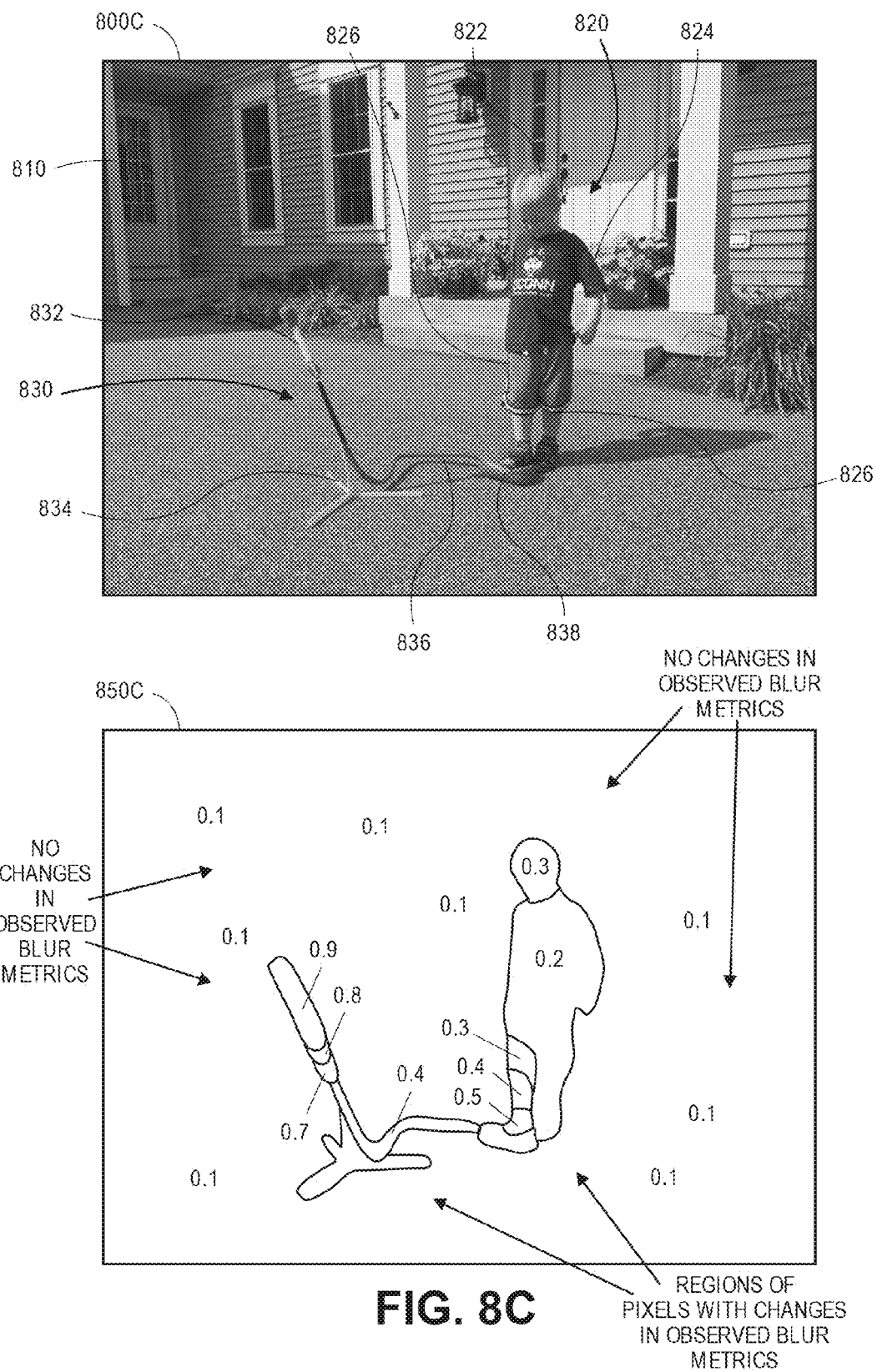

Therefore, based on the changes in the blur metrics calculated using the color image 800A of FIG. 8A and the color image 800B of FIG. 8B, regions of pixels where such blur metrics are determined to have changed may be digitized, while regions of pixels where such blur metrics are determined to not have changed need not be digitized. Referring to FIG. 8C, the color image 800C of the scene 810 and an updated blur image 850C generated based on the color image 800C are shown. The color image 800C shows the actor 820 after having depressed one of his legs 826 into the bladder 838, thereby charging air from the bladder 838 through the hose 836 and the launcher 834, causing the rocket 832 to lift from the launcher 834. Thus, as is shown in the updated blur image 850C of FIG. 8C, portions of the color image 800C corresponding to the rocket 832 have very high blur metrics (e.g., a blur metric of 0.9 on the rocket 832, along with blur metrics of 0.7 and 0.8 along trailing edges of the rocket 832), while other portions of the color image 800C have comparatively lower blur metrics (e.g., blur metrics of 0.2 to 0.5 for the actor 820), and still other portions of the color image 800C have blur metrics that are both low and unchanged (e.g., background elements of the scene 810).

Figure 8D:
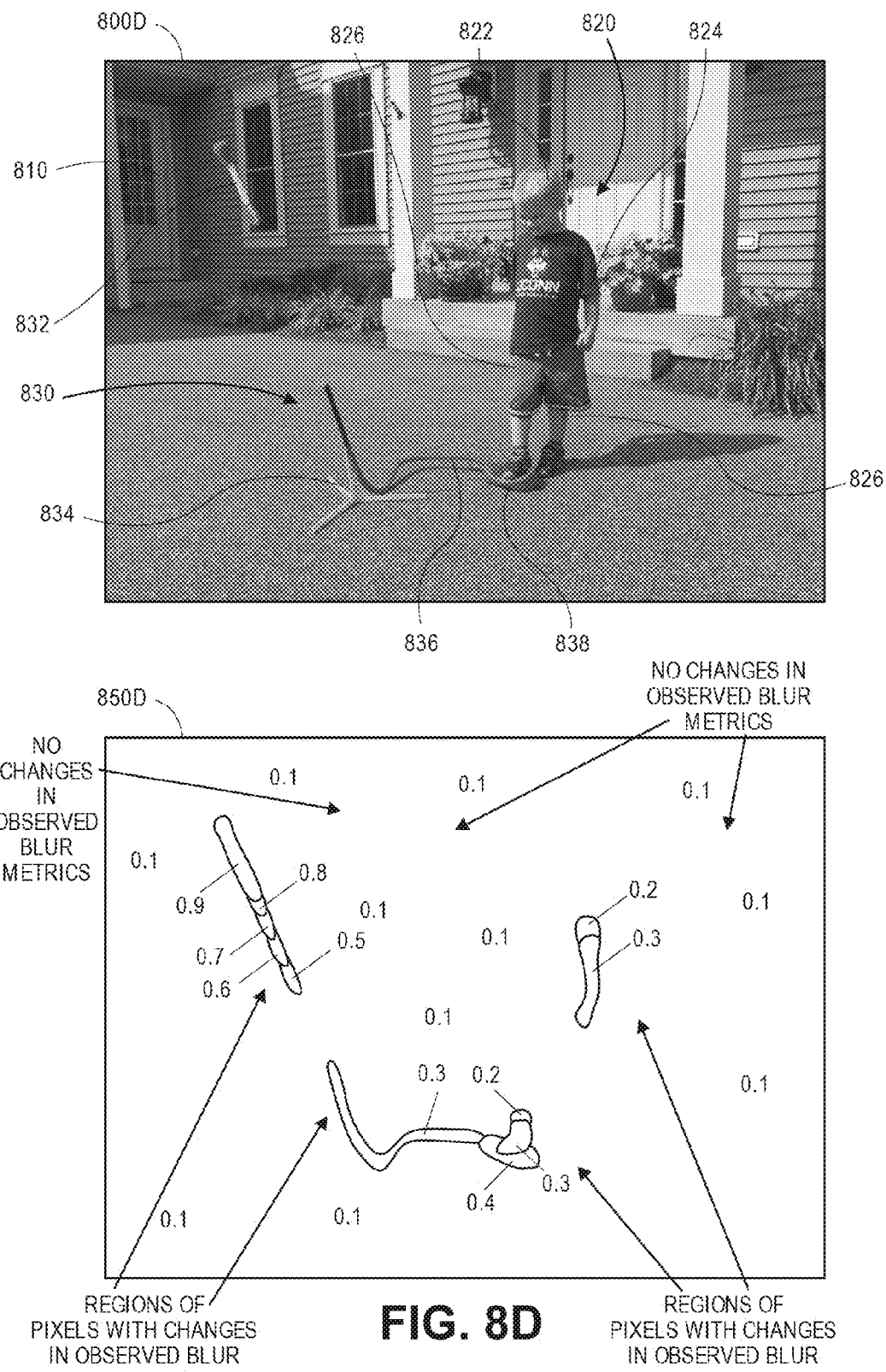
Figure 8E:
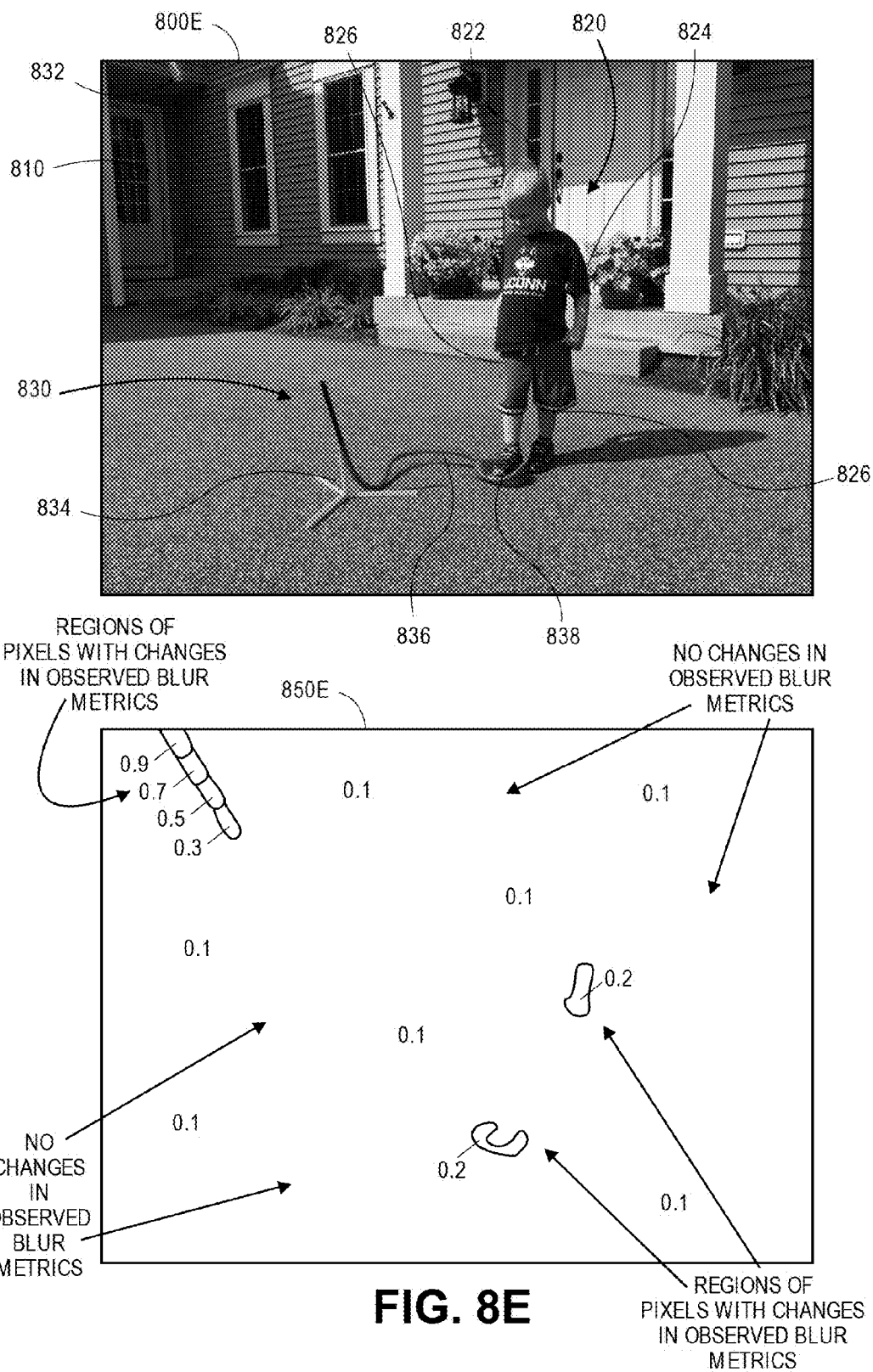

Similarly, referring to FIG. 8D, the color image 800D of the scene 810 shows the rocket 832 clear of the launcher 834, and the actor 820 substantially stable with one leg 826 depressed into the bladder 838. Thus, as is shown in an updated blur image 850D generated based on the color image 800D, portions of the color image 800D corresponding to the rocket have very high blur metrics (e.g., blur metrics of 0.9 on the rocket 832, and 0.5 to 0.8 along trailing edges of the rocket 832), while other portions of the color image 800D have comparatively lower blur metrics, and still other portions have blur metrics that are both low and unchanged (e.g., background elements of the scene 810). Likewise, referring to FIG. 8E, the color image 800E of the scene 810 shows the rocket 832 nearly leaving the scene 810, and the actor 820 nearly motionless, with one leg 826 on the bladder 838. Thus, as is shown in an updated blur image 850E generated based on the color image 800E, portions of the color image 800E corresponding to the rocket 832 have moderate to very high blur metrics (e.g., blur metrics ranging from 0.3 to 0.9), while other portions of the color image 800E corresponding to the actor 820 and the background portions of the scene 810 include comparatively low blur metrics (e.g., blur metrics of 0.1) and are shown as substantially clear within the color image 800E. Using the changes in blur metrics, and the determined values of the blur metrics, as identified in the blur image 850A and the updated blur images 850B, 850C, 850D, 850E, determinations as to which regions of pixel sensors should be digitized and when may be made.

Those of ordinary skill in the pertinent arts will recognize that the systems and methods disclosed herein may be utilized in connection with any number of applications. For example, the blur metrics or blur images determined in accordance with the present disclosure may be used to focus imaging devices that are configured to capture not only moving images (e.g., multiple frames in series) but also still images (e.g., single, discrete frames). A low-resolution image captured by an imaging device prior to a high-resolution image or video file, and the calculation of blur metrics or blur images based on the low-resolution image, may be used to properly focus the imaging device, and result in improved image quality and frame rate, as a result.

Additionally, by utilizing blur metrics or blur images to determine an amount of data to be digitized, or to manage a rate at which such data is digitized, smaller imaging devices (e.g., those devices provided on smartphones or tablet computers) having limited processing power or capacity may ultimately generate higher quality images having higher levels of resolution and lower levels of noise. Additionally, three-dimensional cameras or perspective cameras may be made more feasible, as such cameras may be directed to focus on and/or digitize regions of pixels experiencing high or changing levels of blur, or to digitize such regions of pixels more frequently, as compared to regions of pixels experiencing low or constant levels of blur. The number, type or kind of application in which the blur metrics and/or blur images of the present disclosure may be utilized are not limited.

Although some of the embodiments disclosed herein reference the calculation of "blur metrics" or "blur values" and the generation of "blur images" based on such blur metrics or blur values, those of ordinary skill in the pertinent art will recognize that the systems and methods disclosed herein are not so limited. For example, the systems and methods of the present disclosure may operate by determining levels of sharpness, and generating images based on such levels, such that references to blur metrics, blur values or blur images could be easily replaced with references to "sharp metrics" or "sharp values," and used to generate "sharp images" accordingly.

Additionally, although some of the embodiments disclosed herein reference blur metrics as having values between zero and one, or, more specifically, numbers to a single significant digit (e.g., a tenths place), those of ordinary skill in the pertinent arts will recognize that blur metrics of the present disclosure are not so limited, and may be expressed in any absolute or relative value, according to any scale, and with any number of significant digits.

Furthermore, although some of the embodiments described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An imaging device comprising:
   an imaging sensor having a photosensitive surface with a plurality of pixel sensors;
   at least one memory device; and
   at least one computer processor,
   wherein the at least one computer processor is configured to at least:
      identify a first color image captured using the imaging sensor, wherein the first color image comprises a first plurality of image pixels;
      define a blur image based at least in part on contents of the first plurality of image pixels;
      define a plurality of regions of image pixels within the blur image, wherein each of the regions comprises image pixels having substantially similar content;
      select a first region of the plurality of regions of image pixels of the blur image, the first region comprising image pixels having a level of blur that is greater than levels of blur of other regions of the plurality of regions;
      identify a first subset of the plurality of pixel sensors of the photosensitive surface corresponding to the first region of the blur image;
      expose the first subset of the plurality of pixel sensors to light for a first predetermined period of time;
      digitize a first set of signals generated in response to the exposure of the first subset of the pixel sensors to light for the first predetermined period of time; and
      store a second color image comprising the digitized first set of signals in the at least one memory device.

2. The imaging device of claim 1, wherein the at least one computer processor is further configured to at least:
   determine the first predetermined period of time based at least in part on the level of blur of the image pixels of the first region of the blur image.

3. The imaging device of claim 1, wherein the at least one computer processor is further configured to at least:
   select a second region of the plurality of regions of image pixels of the blur image;
   identify a second subset of the plurality of pixel sensors of the photosensitive surface corresponding to the second region of the blur image;
   expose the second subset of the plurality of pixel sensors to light for a second predetermined period of time; and
   digitize a second set of signals generated in response to the exposure of the second subset of the pixel sensors to light for the second predetermined period of time,
   wherein the second color image further comprises the digitized second set of signals.

4. The imaging device of claim 3, wherein the at least one computer processor is further configured to at least:
   determine a first frequency for digitizing signals generated in response to exposure of the first subset of the plurality of pixel sensors to light; and
   determine a second frequency for digitizing signals generated in response to the exposure of the second subset of the plurality of pixel sensors to light,
   wherein the first set of signals generated in response to the exposure of the first subset of the pixel sensors to light for the first predetermined period of time are digitized in accordance with the first frequency, and
   wherein the second set of signals generated in response to the exposure of the second subset of the pixel sensors to light for the second predetermined period of time are digitized in accordance with the second frequency.

5. The imaging device of claim 3, wherein the imaging device is aligned to include at least one action associated with a predetermined event within a field of view,
   determine that the first region includes at least a portion of the at least one action; and
   select the first predetermined period of time based at least in part on at least one attribute of the predetermined event,
   wherein the second region does not include any portion of the at least one action.

6. The imaging device of claim 1, wherein the at least one computer processor is further configured to at least:

provide information regarding the first color image as an input to at least one of a Laplacian operator, a Sobel operator or a Tenengrad operator; and determine levels of blur for each of the first plurality of image pixels based at least in part on an output from the Laplacian operator, the Sobel operator or the Tenengrad operator.

7. A computer-implemented method comprising:

identifying a first digital image captured using a first imaging device, wherein the first digital image comprises a first plurality of image pixels, and wherein the first imaging device comprises a data store and a photosensitive surface having an array of pixel sensors;

selecting a first subset of the first plurality of image pixels, wherein each of the image pixels of the first subset has a substantially similar level of blur;

identifying a first subset of the array of pixel sensors corresponding to the first subset of the first plurality of image pixels, wherein the first subset of the array of pixel sensors is selected based at least in part on the level of blur of the first plurality of image pixels;

exposing at least the first subset of the array of pixel sensors to light for a first period of time;

converting a first set of analog signals to a second plurality of image pixels, wherein each of the first set of analog signals is generated in response to the exposure of the first subset of the array of pixel sensors to light; and storing a second digital image comprising the second plurality of image pixels in the data store.

8. The computer-implemented method of claim 7, further comprising:

selecting a second subset of the first plurality of image pixels, wherein each of the image pixels of the second subset has a substantially similar level of blur;

identifying a second subset of the array of pixel sensors corresponding to the second subset of the first plurality of image pixels, wherein the second subset of the array of pixel sensors is selected based at least in part on the level of blur of the second plurality of image pixels; and after converting the first set of analog signals to the second plurality of image pixels, exposing at least the second subset of the array of pixel sensors to light for a second period of time; and converting a second set of analog signals to a third plurality of image pixels, wherein each of the second set of analog signals is generated in response to the exposure of the second subset of the array of pixel sensors to light, and wherein the second digital image comprises the second plurality of image pixels and the third plurality of image pixels.

9. The computer-implemented method of claim 7, wherein selecting the first subset of the first plurality of image pixels comprises:

determining a blur metric for at least some of the first plurality of image pixels of the first digital image;

storing the blur metrics for the at least some of the first plurality of image pixels of the first digital image in the data store; and selecting the first subset of the first plurality of image pixels based at least in part on the blur metrics.

10. The computer-implemented method of claim 9, wherein selecting the first subset of the first plurality of image pixels further comprises:

defining a plurality of subsets of the first plurality of image pixels of the first digital image based at least in part on the blur metrics, wherein each of the subsets of the first plurality of image pixels of the first digital image comprises image pixels having a substantially similar blur metric; and selecting one of the plurality of subsets comprising image pixels having a highest blur metric, wherein the first subset of the first plurality of image pixels is the selected one of the plurality of subsets.

11. The computer-implemented method of claim 9, further comprising:

determining a ranking of at least some of the plurality of subsets of the first plurality of image pixels of the first digital image based at least in part on the blur metrics; and defining a digitization priority for the at least some of the plurality of subsets based at least in part on the ranking, wherein the first subset of the array of pixel sensors is identified based at least in part on the digitization priority.

12. The computer-implemented method of claim 9, further comprising:

determining a blur metric for at least some of the second plurality of image pixels of the second digital image;

storing the blur metrics for the at least some of the second plurality of image pixels of the second digital image in the data store, defining a plurality of subsets of the second digital image based at least in part on the blur metrics, wherein each of the subsets of the second digital image comprises image pixels having a substantially similar blur metric;

selecting a second subset of the second plurality of image pixels, wherein each of the image pixels of the second subset has a substantially similar level of blur;

selecting a second subset of the array of pixel sensors corresponding to the second subset of the second plurality of image pixels, wherein the second subset of the array of pixel sensors is selected based at least in part on the blur metrics of the second subset of the second plurality of image pixels;

exposing at least the second subset of the array of pixel sensors to light for a second period of time;

converting a second set of analog signals to a third plurality of image pixels, wherein each of the second set of analog signals is generated in response to the exposure of the second subset of the array of pixel sensors to light; and storing a third digital image comprising the third plurality of image pixels in the data store.

13. The computer-implemented method of claim 12, wherein the second subset of the array of pixel sensors is the first subset of the array of pixel sensors, and wherein exposing at least the second subset of the array of pixel sensors to light for the second period of time comprises:

determining the second period of time based at least in part on a difference between the blur metrics of the second subset of the second plurality of image pixels and the blur metrics of the first subset of the first plurality of image pixels.

14. The computer-implemented method of claim 7, wherein the first digital image has a first level of resolution, wherein the second digital image has a second level of resolution, and wherein the second level of resolution exceeds the first level of resolution.

15. The computer-implemented method of claim 7,
wherein the first digital image is a first frame of a video file,
wherein the second digital image is a second frame of the video file, and
wherein the second frame immediately follows the first frame in the video file.

16. A mobile computing device comprising:
an imaging sensor having an array of pixel sensors;
at least one memory device; and
at least one computer processor,
wherein the at least one computer processor is configured to at least:
capture a first color image using the imaging sensor, wherein the first color image comprises a first plurality of image pixels, and wherein the first color image has a first level of resolution;
determine a first plurality of blur metrics based at least in part on the first plurality of image pixels, wherein each of the first plurality of blur metrics corresponds to one of the first plurality of image pixels;
define a blur image based at least in part on the first plurality of blur metrics, wherein the blur image comprises a plurality of regions of the first plurality of image pixels, and wherein each of the regions consists of image pixels having blur metrics of a substantially similar value;
select a first region of the plurality of regions of the blur image based at least in part on the blur metrics of the image pixels of the first region;
identify the pixel sensors corresponding to the image pixels of the first region of the blur image;
determine a first exposure time for the pixel sensors corresponding to the image pixels of the first region of the blur image based at least in part on the blur metrics of the image pixels of the first region of the blur image;
expose the pixel sensors corresponding to the image pixels of the first region of the blur image to light for the first exposure time;
convert a first set of analog signals to a second plurality of image pixels, wherein each of the first set of analog signals is generated in response to the exposure of the pixel sensors corresponding to the image pixels of the first region of the blur image to light for the first exposure time; and
store a second color image comprising the second plurality of image pixels in the at least one memory device, wherein the second color image has a second level of resolution, and
wherein the second level of resolution exceeds the first level of resolution.

17. The mobile computing device of claim 16, wherein the at least one computer processor is configured to at least:
cause the mobile computing device to be placed in motion,
wherein the mobile computing device is mounted to at least one of an unmanned aerial vehicle or an autonomous mobile robot.

18. The mobile computing device of claim 16, wherein the at least one computer processor is further configured to at least:
select a second region of the plurality of regions of the blur image based at least in part on the blur metrics of the image pixels of the second region;
identify the pixel sensors corresponding to the image pixels of the second region of the blur image;
determine a second exposure time for the pixel sensors corresponding to the image pixels of the second region of the blur image based at least in part on the blur metrics of the image pixels of the second region;
expose the pixel sensors corresponding to the image pixels of the second region of the blur image to light for the second exposure time; and
convert a second set of analog signals to a third plurality of image pixels, wherein each of the second set of analog signals is generated in response to the exposure of the pixel sensors corresponding to the image pixels of the second region of the blur image to light for the second exposure time,
wherein the second color image comprises the second plurality of image pixels and the third plurality of image pixels.

19. The mobile computing device of claim 18, wherein the at least one computer processor is further configured to at least:
determine a first digitization frequency for the pixel sensors corresponding to the image pixels of the first region of the blur image; and
determine a second digitization frequency for the pixel sensors corresponding to the image pixels of the second region of the blur image,
wherein the first set of analog signals are converted to the second plurality of image pixels in accordance with the first digitization frequency; and
wherein the second set of analog signals are converted to the third plurality of image pixels in accordance with the second digitization frequency.

20. The mobile computing device of claim 16, wherein the at least one computer processor is further configured to at least:
determine a second plurality of blur metrics based at least in part on the second plurality of image pixels, wherein each of the second plurality of blur metrics corresponds to one of the second plurality of image pixels;
update the blur image based at least in part on the second plurality of blur metrics, wherein the updated blur image comprises a plurality of regions of the second plurality of image pixels, and wherein each of the regions of the second plurality of blur metrics consists of image pixels having a substantially similar value;
select a first region of the plurality of regions of the updated blur image based at least in part on the blur metrics of the image pixels of the first region;
identify the pixel sensors corresponding to the image pixels of the first region of the updated blur image;
determine a second exposure time for the pixel sensors corresponding to the image pixels of the first region of the updated blur image based at least in part on the blur metrics of the image pixels of the first region of the updated blur image;
expose the pixel sensors corresponding to the image pixels of the second region of the blur image to light for the second exposure time;
convert a second set of analog signals to a third plurality of image pixels, wherein each of the second set of analog signals is generated in response to the exposure of the pixel sensors corresponding to the image pixels of the first region of the updated blur image to light for the second exposure time; and
store a third color image comprising the third plurality of image pixels in the at least one memory device.

* * * * *